(12) United States Patent
Kim et al.

(10) Patent No.: US 7,680,012 B2
(45) Date of Patent: Mar. 16, 2010

(54) RECORDING MEDIUM, METHOD OF CONFIGURING CONTROL INFORMATION THEREOF, RECORDING AND/OR REPRODUCING METHOD USING THE SAME, AND APPARATUS THEREOF

(75) Inventors: Jin Yong Kim, Seongnam-si (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/812,798

(22) Filed: Jun. 21, 2007

(65) Prior Publication Data

US 2007/0247986 A1    Oct. 25, 2007

Related U.S. Application Data

(63) Continuation of application No. 10/883,797, filed on Jul. 6, 2004.

(30) Foreign Application Priority Data

| Jul. 7, 2003 | (KR) | ............... | 10-2003-0045825 |
| Jul. 16, 2003 | (KR) | ............... | 10-2003-0048747 |
| Aug. 14, 2003 | (KR) | ............... | 10-2003-0056540 |

(51) Int. Cl.
  *G11B 7/013* (2006.01)
(52) U.S. Cl. ............. 369/59.25; 369/275.3; 369/59.11; 369/47.51
(58) Field of Classification Search ............. 369/59.25, 369/47.27, 47.36, 47.38, 189, 59.11, 47.51, 369/275.3
See application file for complete search history.

(56) References Cited

U.S. PATENT DOCUMENTS

| 5,361,173 A | 11/1994 | Ishii et al. |
| 5,486,469 A | 1/1996 | Antranikian et al. |
| 5,502,702 A | 3/1996 | Nakajo |
| 5,590,096 A | 12/1996 | Ohtsuka et al. |
| 5,636,631 A | 6/1997 | Waitz et al. |
| 5,764,621 A | 6/1998 | Choi |

(Continued)

FOREIGN PATENT DOCUMENTS

AU    2004254437    1/2005

(Continued)

OTHER PUBLICATIONS

European Office Action dated Sep. 4, 2006.

(Continued)

*Primary Examiner*—Wayne R Young
*Assistant Examiner*—Thomas D Alunkal
(74) *Attorney, Agent, or Firm*—Harness, Dickey & Pierce P.L.C.

(57) ABSTRACT

A method of recording control information in a recording medium, such as an optical disc, including at least one recording layer is provided Velocity information and per recording velocity write strategy (write strategy parameters) is included in control information, such that standardized control information can be uniformly applied to cope with the playback of a recorded optical disc. The method includes steps of recording, per applicable recording velocity, the control information within a management area of the at least one recording layer of the optical disc; and recording at least one write strategy information per the applicable recording velocity within the control information.

47 Claims, 17 Drawing Sheets

U.S. PATENT DOCUMENTS

| | | | |
|---|---|---|---|
| 5,793,546 A | 8/1998 | Tanaka | |
| 5,835,462 A | 11/1998 | Mimnagh | |
| 5,892,633 A | 4/1999 | Ayres et al. | |
| 5,914,920 A | 6/1999 | Yokogawa | |
| 5,959,962 A | 9/1999 | Matsumaru et al. | |
| 6,335,070 B1 | 1/2002 | Tomita | |
| 6,415,435 B1 | 7/2002 | McIntyre | |
| 6,480,450 B1 | 11/2002 | Fujii et al. | |
| 6,487,713 B1 | 11/2002 | Cohen et al. | |
| 6,504,806 B1 * | 1/2003 | Nakajo | 369/59.12 |
| 6,535,470 B1 | 3/2003 | Wu | |
| 6,580,671 B1 | 6/2003 | Otomo et al. | |
| 6,643,233 B1 | 11/2003 | Yen et al. | |
| 6,684,328 B2 | 1/2004 | Matsuura | |
| 6,711,107 B2 | 3/2004 | Chao et al. | |
| 6,868,054 B1 | 3/2005 | Ko | |
| 6,891,786 B2 * | 5/2005 | Sato | 369/47.53 |
| 6,894,961 B1 | 5/2005 | Osakabe | |
| 6,996,047 B2 | 2/2006 | Nagano | |
| 6,999,393 B2 | 2/2006 | Yamada | |
| 7,012,878 B2 | 3/2006 | Shinotsuka et al. | |
| 7,075,871 B2 | 7/2006 | Kato et al. | |
| 7,088,667 B2 | 8/2006 | Kobayashi | |
| 7,161,881 B2 | 1/2007 | Pereira | |
| 7,170,841 B2 * | 1/2007 | Shoji et al. | 369/59.25 |
| 7,193,948 B2 | 3/2007 | Furukawa et al. | |
| 7,212,480 B2 | 5/2007 | Shoji et al. | |
| 7,218,585 B2 | 5/2007 | Tanii et al. | |
| 7,230,907 B2 | 6/2007 | Shoji et al. | |
| 7,286,455 B2 | 10/2007 | Shoji et al. | |
| 7,304,938 B2 | 12/2007 | Hwang et al. | |
| 7,345,970 B2 | 3/2008 | Kim et al. | |
| 7,369,475 B2 | 5/2008 | Nagai | |
| 7,376,072 B2 | 5/2008 | Shoji et al. | |
| 7,400,571 B2 | 7/2008 | Shoji et al. | |
| 7,414,936 B2 | 8/2008 | Tasaka et al. | |
| 7,423,951 B2 | 9/2008 | Shoji et al. | |
| 7,471,879 B2 | 12/2008 | Fuchigami et al. | |
| 2001/0044935 A1 | 11/2001 | Kitayama | |
| 2001/0053114 A1 * | 12/2001 | Miyake et al. | 369/47.55 |
| 2001/0053115 A1 | 12/2001 | Nobukuni et al. | |
| 2002/0021656 A1 * | 2/2002 | Tsukagoshi et al. | 369/275.3 |
| 2002/0044509 A1 | 4/2002 | Nakajima | |
| 2002/0048241 A1 | 4/2002 | Kumagai et al. | |
| 2002/0048646 A1 | 4/2002 | Tomura et al. | |
| 2002/0085470 A1 | 7/2002 | Yokoi | |
| 2002/0089914 A1 | 7/2002 | Nakajo | |
| 2002/0114234 A1 | 8/2002 | Chao et al. | |
| 2002/0126604 A1 | 9/2002 | Powelson et al. | |
| 2002/0126611 A1 | 9/2002 | Chang | |
| 2002/0159352 A1 | 10/2002 | Yamada | |
| 2002/0167879 A1 | 11/2002 | Ohno | |
| 2002/0167880 A1 | 11/2002 | Ando et al. | |
| 2003/0021201 A1 * | 1/2003 | Kobayashi | 369/47.39 |
| 2003/0021202 A1 | 1/2003 | Usui et al. | |
| 2003/0039187 A1 | 2/2003 | Geutskens | |
| 2003/0048241 A1 | 3/2003 | Shin et al. | |
| 2003/0058771 A1 | 3/2003 | Furukawa et al. | |
| 2003/0072251 A1 * | 4/2003 | Kondo | 369/275.3 |
| 2003/0076775 A1 | 4/2003 | Sato et al. | |
| 2003/0086345 A1 | 5/2003 | Ueki | |
| 2003/0086346 A1 | 5/2003 | Fukumoto | |
| 2003/0137915 A1 * | 7/2003 | Shoji et al. | 369/59.25 |
| 2003/0151994 A1 * | 8/2003 | Tasaka et al. | 369/47.53 |
| 2003/0159135 A1 | 8/2003 | Hiller et al. | |
| 2003/0185130 A1 * | 10/2003 | Kamperman et al. | 369/59.25 |
| 2003/0223339 A1 | 12/2003 | Taniguchi et al. | |
| 2003/0231567 A1 * | 12/2003 | Moritomo | 369/53.21 |
| 2003/0237024 A1 | 12/2003 | Ogawa et al. | |
| 2004/0001407 A1 | 1/2004 | Kim et al. | |
| 2004/0004921 A1 | 1/2004 | Lee et al. | |
| 2004/0010745 A1 * | 1/2004 | Lee et al. | 714/769 |
| 2004/0013074 A1 | 1/2004 | Lee et al. | |
| 2004/0022150 A1 * | 2/2004 | Lee et al. | 369/47.39 |
| 2004/0030962 A1 | 2/2004 | Swaine et al. | |
| 2004/0062160 A1 | 4/2004 | Park et al. | |
| 2004/0076096 A1 | 4/2004 | Hwang et al. | |
| 2004/0090888 A1 | 5/2004 | Park et al. | |
| 2004/0114474 A1 | 6/2004 | Park et al. | |
| 2004/0125717 A1 | 7/2004 | Ko et al. | |
| 2004/0145980 A1 | 7/2004 | Park et al. | |
| 2004/0184395 A1 | 9/2004 | Lee et al. | |
| 2004/0223434 A1 | 11/2004 | Nishimura et al. | |
| 2005/0019023 A1 | 1/2005 | Ko | |
| 2005/0030853 A1 * | 2/2005 | Lee et al. | 369/47.22 |
| 2005/0030870 A1 | 2/2005 | Rijpers et al. | |
| 2005/0036425 A1 | 2/2005 | Suh et al. | |
| 2005/0038957 A1 | 2/2005 | Suh | |
| 2006/0221790 A1 | 10/2006 | Suh et al. | |
| 2006/0233059 A1 | 10/2006 | Suh et al. | |
| 2007/0088954 A1 | 4/2007 | Furukawa et al. | |
| 2007/0115765 A1 | 5/2007 | Kobayashi | |
| 2008/0043588 A1 | 2/2008 | Suh et al. | |

FOREIGN PATENT DOCUMENTS

| | | |
|---|---|---|
| CN | 1151071 | 6/1997 |
| CN | 1182497 | 5/1998 |
| CN | 1416115 | 5/2003 |
| CN | 1656544 A | 8/2005 |
| EP | 0265984 | 5/1988 |
| EP | 0 552 903 | 7/1993 |
| EP | 968769 | 1/2000 |
| EP | 1 128 383 | 8/2001 |
| EP | 1172810 | 1/2002 |
| EP | 1244097 | 9/2002 |
| EP | 1298659 | 4/2003 |
| EP | 1308942 | 5/2003 |
| EP | 1329888 | 7/2003 |
| EP | 1331631 | 7/2003 |
| EP | 1361571 | 11/2003 |
| EP | 1369850 | 12/2003 |
| EP | 1471506 | 10/2004 |
| EP | 1 522 994 | 4/2005 |
| EP | 1605445 | 12/2005 |
| JP | 6-309802 | 11/1994 |
| JP | 9-128899 | 5/1997 |
| JP | 09-134525 | 5/1997 |
| JP | 9-147487 | 6/1997 |
| JP | 09-160761 | 6/1997 |
| JP | 9-282661 | 10/1997 |
| JP | 11-085413 | 3/1999 |
| JP | 2000-113458 | 4/2000 |
| JP | 2000-163746 | 6/2000 |
| JP | 2001-052337 | 2/2001 |
| JP | 2001-297447 | 10/2001 |
| JP | 2001-312861 | 11/2001 |
| JP | 2002-050040 | 2/2002 |
| JP | 2002-050053 | 2/2002 |
| JP | 2002-074855 | 3/2002 |
| JP | 2002-124038 | 4/2002 |
| JP | 2002-230764 | 8/2002 |
| JP | 2002-245624 | 8/2002 |
| JP | 2002-245625 | 8/2002 |
| JP | 2002-352430 | 12/2002 |
| JP | 2002-352435 | 12/2002 |
| JP | 2003-006860 | 1/2003 |
| JP | 2003-045036 | 2/2003 |
| JP | CN 1400588 | 3/2003 |
| JP | 2003-178448 | 6/2003 |
| JP | 2003-203341 | 7/2003 |
| JP | 2003-257026 | 9/2003 |
| JP | 2004-005772 | 1/2004 |
| JP | 2006-507760 | 3/2006 |

| KR | 2001-0011557 | 2/2001 |
| RU | 2092910 | 10/1997 |
| TW | 509935 | 11/2002 |
| WO | WO 97/13244 | 4/1997 |
| WO | WO 00/79525 | 12/2000 |
| WO | WO 01/06500 | 1/2001 |
| WO | WO 02-17308 | 2/2002 |
| WO | WO 02/29791 | 4/2002 |
| WO | WO 02/065462 | 8/2002 |
| WO | WO 02-086887 | 10/2002 |
| WO | WO 02/086888 | 10/2002 |
| WO | WO 02/089123 | 11/2002 |
| WO | WO 03/010519 | 2/2003 |
| WO | WO 03/025935 | 3/2003 |
| WO | WO 03/030153 | 4/2003 |
| WO | WO 03/046896 | 6/2003 |
| WO | WO 03/067581 | 8/2003 |
| WO | WO 03/075265 | 9/2003 |
| WO | WO 03/105139 | 12/2003 |
| WO | WO 2004/013845 | 2/2004 |
| WO | WO 2004-015707 | 2/2004 |
| WO | WO 2004/072966 | 8/2004 |
| WO | WO 2005/001819 | 1/2005 |

OTHER PUBLICATIONS

PCT International Search Report, dated Sep. 10, 2004.
Russian Office Action (dated Jun. 23, 2008) for counterpart Russian Patent Application No. 2004122413/28(024371) is provided for the purposes of certification under 37 CFR § 1.97(e).
Search Report for European Application No. 07120273.3 dated Jul. 2, 2008.
Office Action for corresponding Chinese Application No. 200710127832 dated Dec. 5, 2008.
European Search Report dated Mar. 27, 2009 for counterpart Application No. 07017410.7-1232.
Japanese Office Action dated Mar. 17, 2009 for corresponding Japanese Application No. 2006-523136.
Article: Standard ECMA-279—Standardizing Information and Communication Systems—80 mm (1,23 Gbytes per side) and 120 mm (3,95 Gbytes per side) DVD-Recordable Disk (DVD-R), Dec. 1998.
Notice of Allowance issued by Russian Patent Office dated May 14, 2009 for counterpart Russian application.
Notice of Allowance issued by Russian Patent Office dated Apr. 16, 2009 for counterpart Russian application.
Notice of Allowance issued by U.S. Patent and Trademark Office dated Jun. 8, 2009 for U.S. application.
Office Action issued by U.S. Patent and Trademark Office dated Jun. 26, 2009 for U.S. application.
Office Action dated Sep. 1, 2009 by the Japanese Patent Office for a counterpart Japanese application.
Notice of Allowance dated Aug. 24, 2009 by the Russian Patent Office for a counterpart Russian application.
Notice of Allowance dated Aug. 12, 2009 by the Russian Patent Office for a counterpart Russian application.
Japanese Office Action dated Sep. 24, 2009 corresponding to counterpart Japanese application.
Japanese Office Action dated Sep. 4, 2009 corresponding to counterpart Japanese application.
Chinese Office Action dated Sep. 4, 2009 corresponding to counterpart Chinese application.
Chinese Office Action dated Sep. 4, 2009 corresponding to counterpart Chinese application.
Korean Office Action dated Oct. 23, 2009 corresponding to counterpart Korean application.
Malaysian Office Action dated Oct. 30, 2009.

* cited by examiner

FIG. 6B

| byte number | contents | number of bytes |
|---|---|---|
| 0 | Disc information identifier | 2 |
| 5 | DI frame sequence number in DI block | 1 |
| N | WS-1 (0000 0001b) | 1 |
| ... | ... | ... |
| L to 11 | Maximum dc read power | M |
| | Maximum HF modulated read power | |
| | Write power settings at recording velocity | |
| | $T_{MP}$ write pulse duration | |
| | $T_{top}$ first write pulse duration | |
| | $dT_{top}$ first write pulse start time at recording velocity | |
| | $T_E$ erase multi-pulse duration | |
| | $dT_E$ first erase pulse start time at recording velocity | |

The rows from "Maximum dc read power" through "$dT_E$ first erase pulse start time at recording velocity" are the Write Strategy Parameters (WS code = WS-1).

N → 00h (Layer 0, 1x DI)

RECORDING MEDIUM, METHOD OF CONFIGURING CONTROL INFORMATION THEREOF, RECORDING AND/OR REPRODUCING METHOD USING THE SAME, AND APPARATUS THEREOF

DOMESTIC PRIORITY INFORMATION

This is a continuation-application of application Ser. No. 10/883,797 filed Jul. 6, 2004, the entire contents of which are hereby incorporated by reference.

FOREIGN PRIORITY INFORMATION

This application claims the benefit of Korean Applications No. 10-2003-0045825 filed on Jul. 7, 2003, No. 10-2003-0048747 filed on Jul. 16, 2003, and No. 10-2003-0056540 filed on Aug. 14, 2003, which are hereby incorporated by reference.

BACKGROUND OF THE INVENTION

1. Field of the Invention

The present invention relates to a method of recording control information on a recording medium, such as a recordable optical disc, having at least one recording layer, and more particularly, to a method in which record velocity information and write strategy parameters are included in the control information.

2. Discussion of the Related Art

A high density optical recording medium, known as HD-DVD, is widely used to record and store high-definition video data and high-quality audio data. The Blu-ray disc represents next-generation HD-DVD technology.

Technological specifications are now being established for the global standardization of the Blu-ray disc, including standards are for the write-once Blu-ray disc (BD-WO). Meanwhile, a rewritable Blu-ray disc, known as the 1x-speed BD-RE and now being discussed, should be compatible with BD-RE discs expected to have higher recording velocities, i.e., the 2x-speed BD-RE and beyond. BD-WO specifications for high recording velocity are also in progress. Efficient solutions for coping with the high recording velocity of a high-density optical disc are urgently needed, and the specifications established should ensure mutual compatibility.

SUMMARY OF THE INVENTION

The present invention relates to a method for recording control information on a recording medium having one or more recording layers.

In one embodiment, the method includes defining control information for controlling reproducing/recording data. The control information includes an identification (ID) of each recording layer to which the control information applies and recording parameters according to each recording layer. The method further includes recording the control information on a specific area of the recording medium.

The present invention further relates to a recording medium having one or more recording layers.

In one embodiment, the recoding medium includes a data area configured to record user data on each recording layer, and one or more management areas configured to store control information for controlling reproducing/recording the user data. The control information includes an identification (ID) of each recording layer to which the control information applies and recording parameters according to each recording layer.

Still further, the present invention relates to an apparatus for recording control information on a recording medium having one or more recording layers.

In one embodiment, the apparatus includes a controller for defining control information for controlling reproducing/recording data. The control information includes an identification (ID) of each recording layer to which the control information applies and recording parameters according to each recording layer. The apparatus further includes a recording unit for recording the control information on a specific area of the recording medium.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6A to 6E are diagrams of disc information recorded according to a third embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A Blu-ray disc is taken as an example of an optical disc according to the present invention. Yet, the concept of the present invention, characterized in an optical disc having its disc control information recorded thereon, is applicable to DVD-RAM, DVD–RW, DVD+RW, DVD–R, DVD+R, and similar such discs.

Although the terminology used herein is well known for the most part, some terms have been chosen by the applicant, such that the present invention should be understood with the intended meanings of the terminology as used by the applicant. For example, the "disc control information" of a disc is recorded in a specified area, i.e., a recordable area of the disc or a prerecorded area (sometimes known as an embossed area, in which manufacturer data is recorded and where no further recording is possible), and includes information necessary for the playback of a recorded disc. Disc control information is called "disc information" or "DI" in relation to Blu-ray disc technology but is typically referred to as "physical format information" for DVD-RAM, DVD-RW, DVD+RW, DVD-R, and DVD+R discs. Hence, it should be apparent that the technical background of the present invention is equally applicable to physical format information.

Moreover, the disc information according to the present invention is recorded as an unspecified unit of information, which may be counted, for example, as a first or second information.

Figure 1:
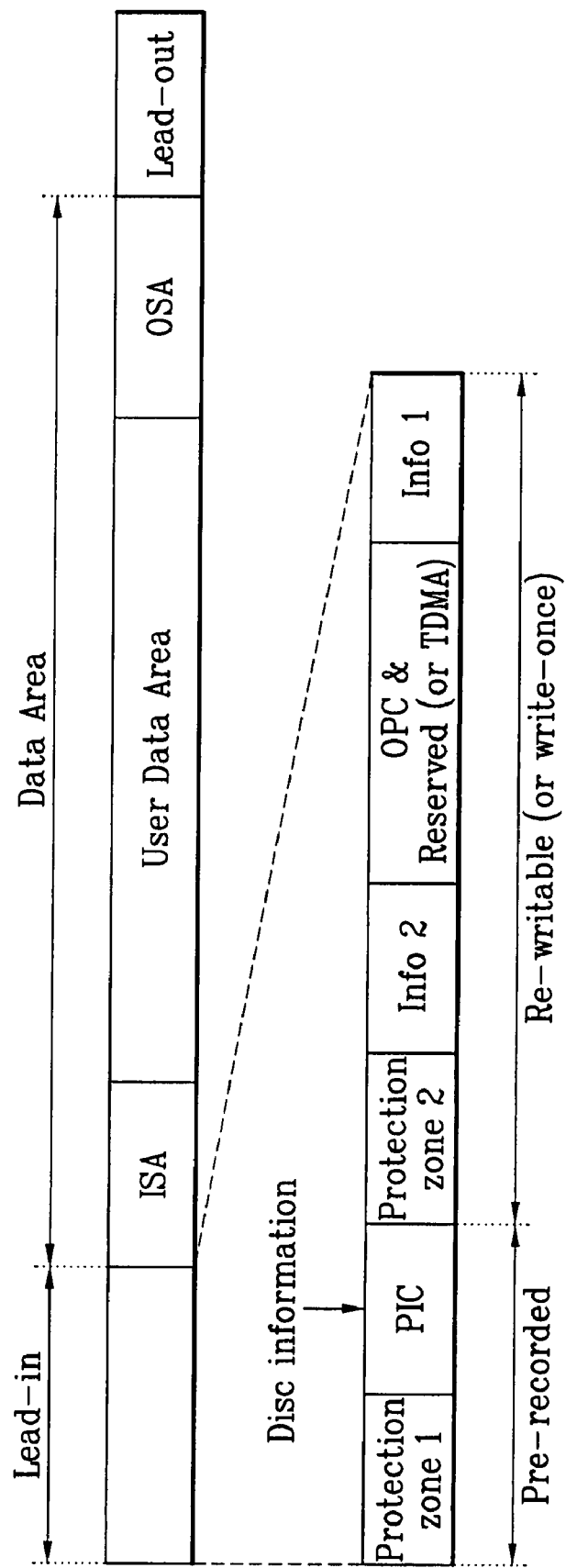
FIG. 1 is a diagram of a single-layer disc applicable to the present invention.
Figure 2:
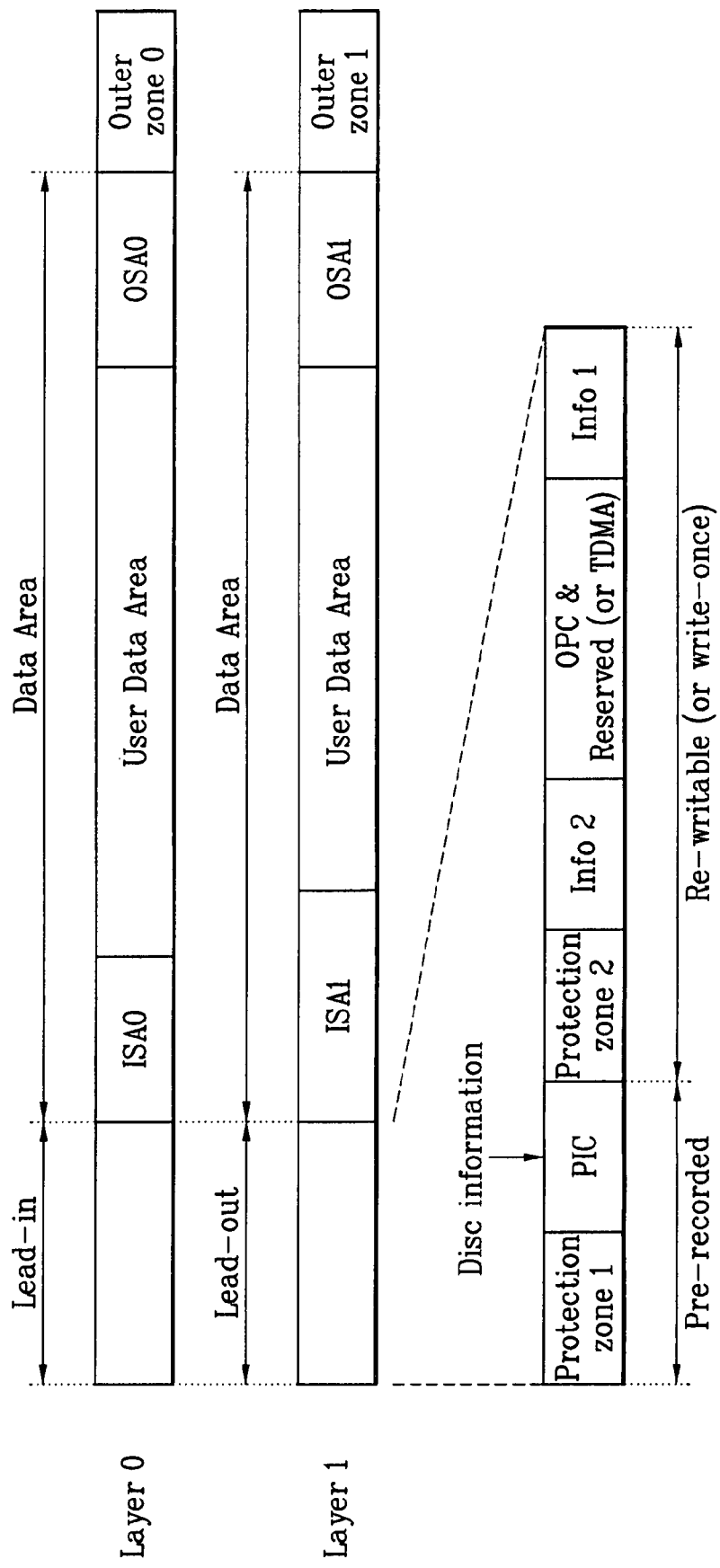
FIG. 2 is a diagram of a dual-layer disc applicable to the present invention.

FIGS. 1 and 2 illustrate the structure of optical discs according to the present invention, in which any recordable optical disc may be applicable to the present invention. The recordable disc may be, for example, a rewritable optical disc or a write-once optical disc.

Referring to FIG. 1, illustrating an optical disc having one recording layer, a lead-in area is provided as a management area on an inner circumference area of an optical disc, whereas a lead-out area is provided as a management area on an outer circumference area of the optical disc. In the inner circumference area, a pre-recorded area and a rewritable (or write-once) area are provided separately. In BD-RE and BD-WO technology, the pre-recorded area is called the PIC area, where permanent information and control data is recorded, and disc information is recorded in the PIC area. A data area is made up of a user data area where user data is recorded and inner and outer spare areas ISA and OSA, which are used in the replacement of the data of a defective area. In the case of a BD-WO disc, a temporary defect management area (TDMA) is provided for recording information of a defect and for general management. The TDMA is unnecessary in the case of BD-RE discs, which have a corresponding area designated as reserved.

The present invention intends to provide a method of recording disc information (DI) as disc control information required for record playback of a disc in a pre-recorded or recordable are. It is apparent that a recording method in the pre-record area is differently applied to each kind of disc. In the case of BD-RE and BD-WO discs, the pre-recorded area is the PIC area recorded using a biphased high-frequency modulated signal reproduced according to a specific playback method, to acquire the disc information.

FIG. 2 illustrates an optical disc having dual recording layers, in which an inner circumference area of the disc has a lead-in of a first recording layer (Layer 0) corresponding to a lead-out of a second recording layer (Layer 1). In this case, one PIC area is provided in each of the lead-in and lead-out areas, and the same disc information is recorded in each PIC area.

Figure 3:
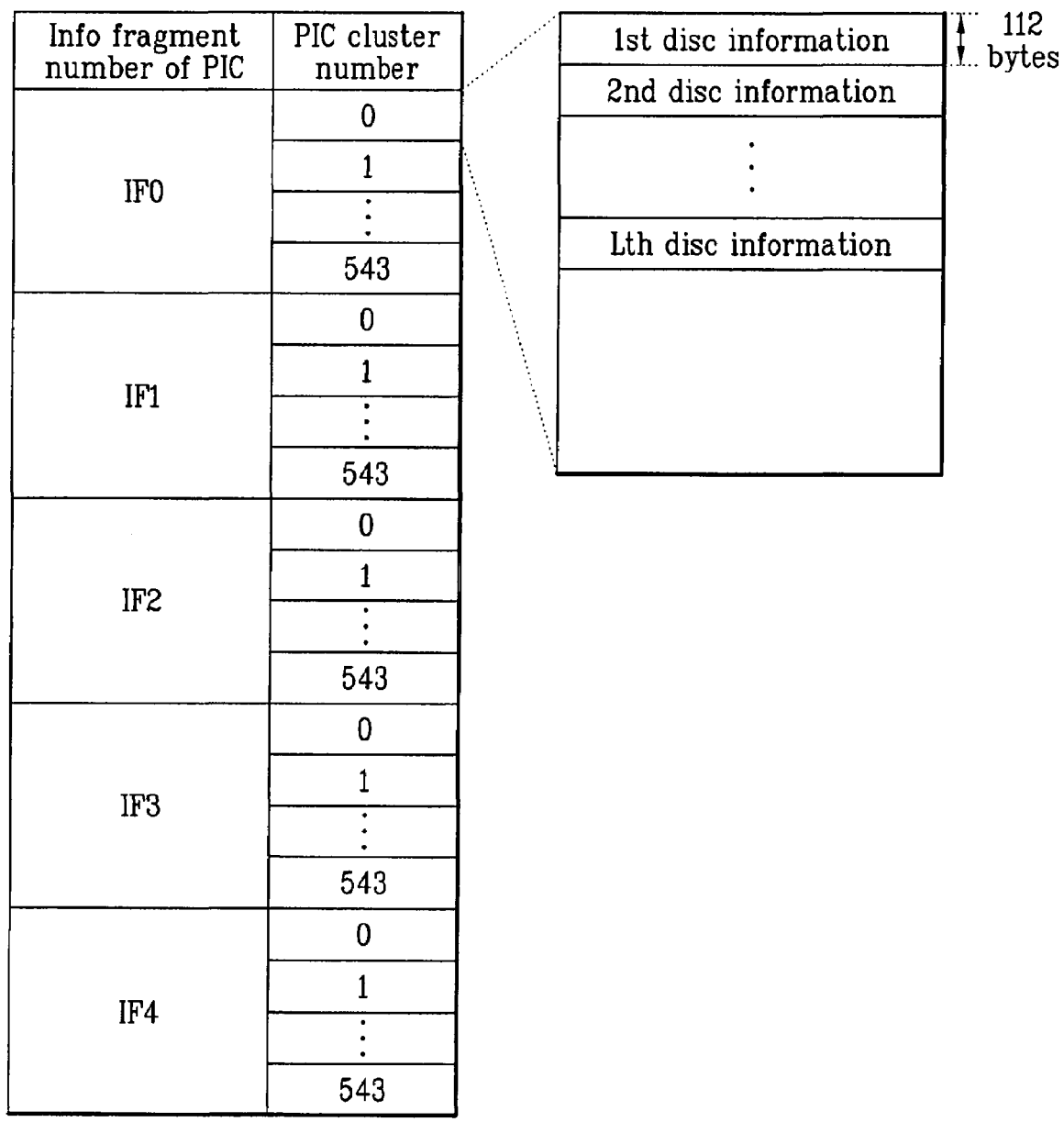
FIG. 3 is a diagram of a management area where disc control information of the present invention is recorded, in which a format of recording the disc information in a corresponding area is schematically shown.

FIG. 3 illustrates a PIC area formatted according to the present invention. In configuring the disc information of the PIC area of a BD-RE or BD-WO disc, the minimum recording unit is one cluster, 544 clusters constitute one fragment and five fragments make up the PIC area. Disc information is recorded in a front head cluster of a first fragment IFO. The disc information is plurally recorded per recording layer and recording velocity permitted by the corresponding optical disc. One disc information includes 112 bytes, sometimes referred to as a DI frame. To cope with a loss of disc information, the same contents of the disc information are repeatedly recorded in each front head cluster of the remainder of the fragments.

Information representing the corresponding recording layer, information representing recording velocity, and write strategy information corresponding to the recording velocity are included in each disc information. Such information is utilized in recording and reproducing the optical disc, to provide an optimal condition per recording layer and per recording velocity.

The disc information of the present invention is characterized in providing specific recording velocity information supported by the disc and associated write strategy information, and more specifically, in providing specific recording velocity supported for each recording layer and associated write strategy information via a specified method for discs having a plurality of recording layers.

The specific configuration of the disc information is for a Blu-ray disc, which may differ from the configuration of a DVD-based disc. Specifically, the recording DI volume for a Blu-ray disc is 112 bytes or equivalent. By formulating the disc information of the same recording layer as one information, i.e., without repeating any common information, the write strategy configuration may differ per recording velocity.

Figure 4A:
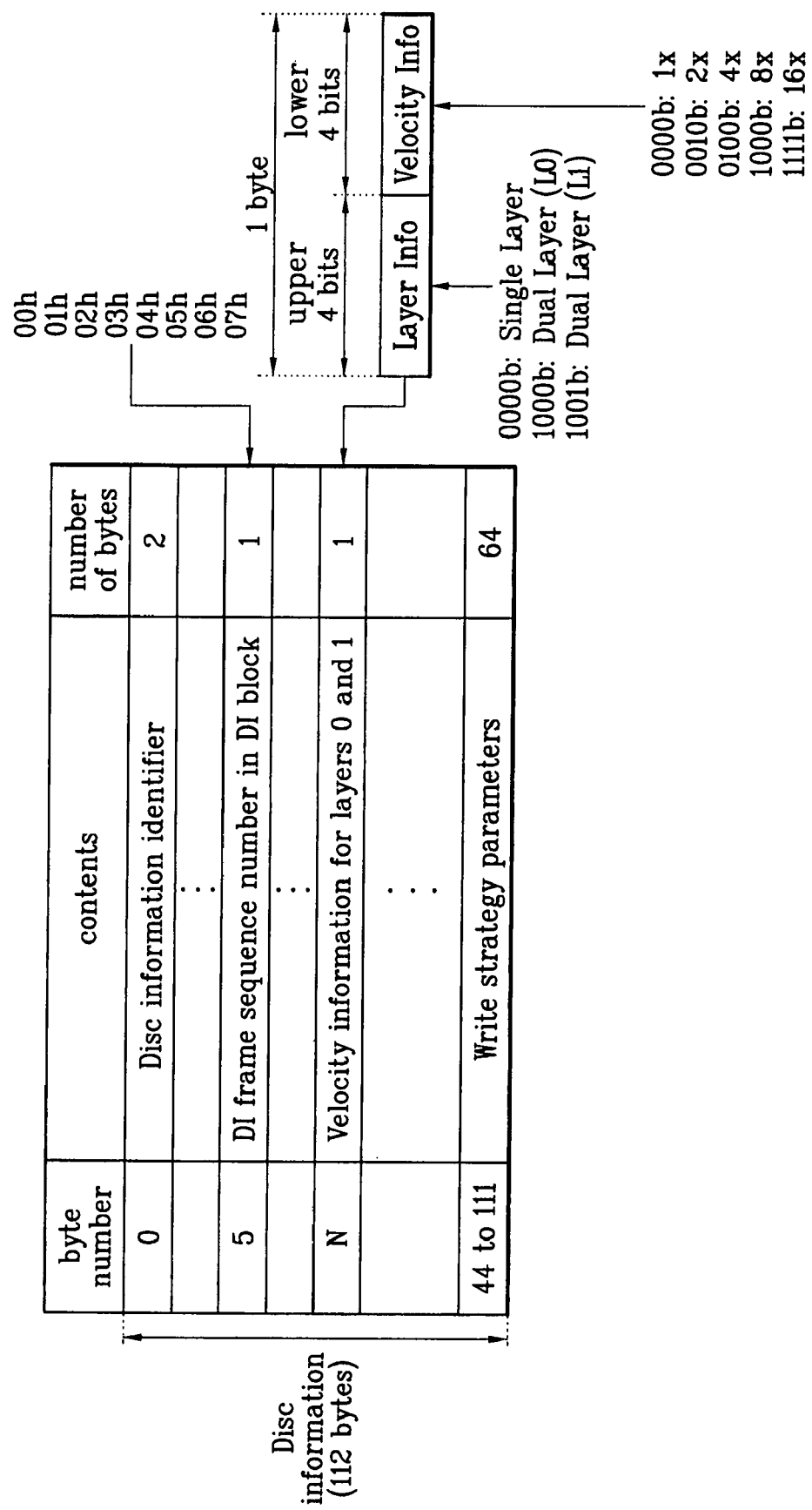
FIGS. 4A to 4C are diagrams of disc information recorded according to a first embodiment of the present invention.
Figure 4B:
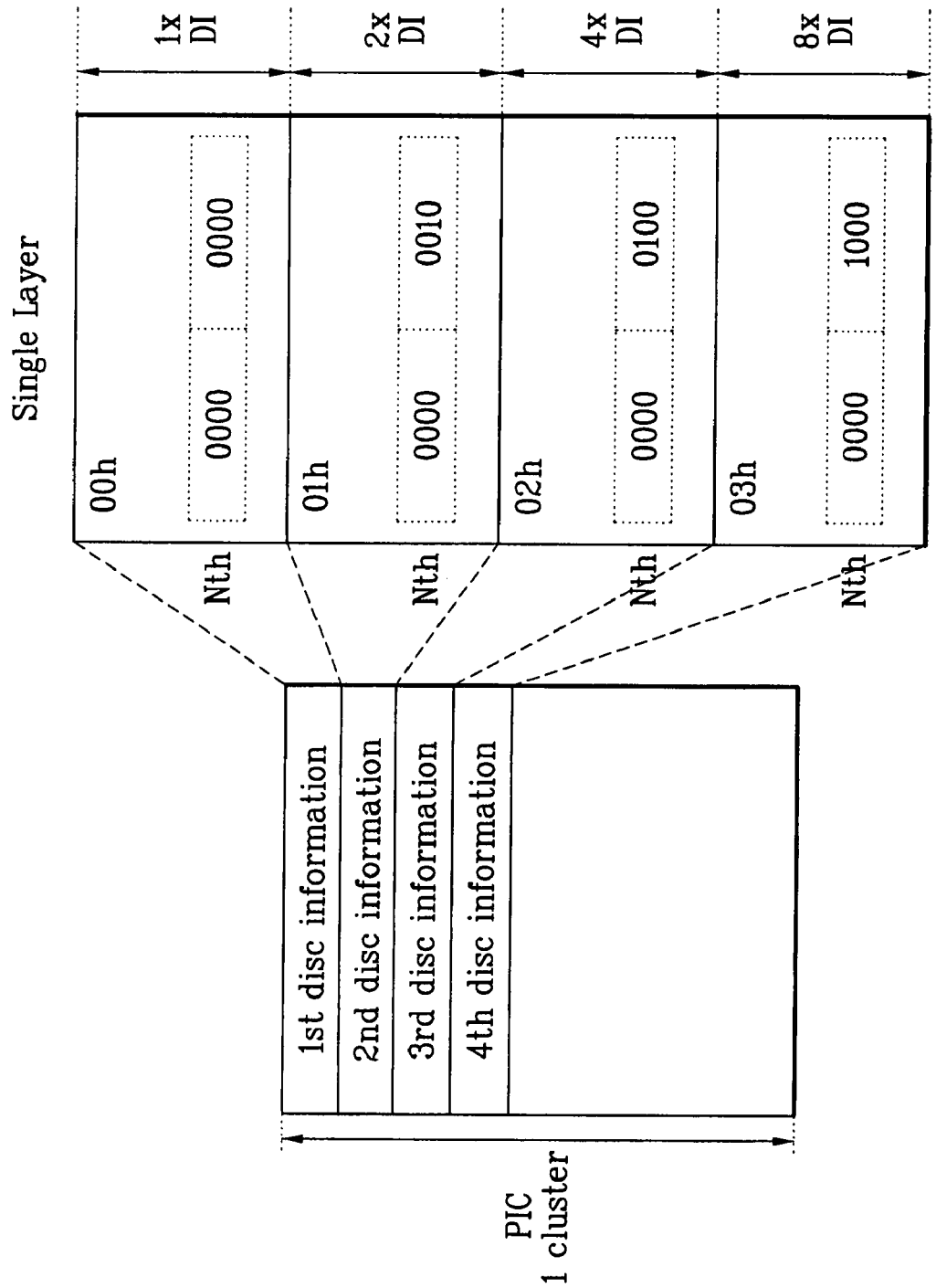
Figure 4C:
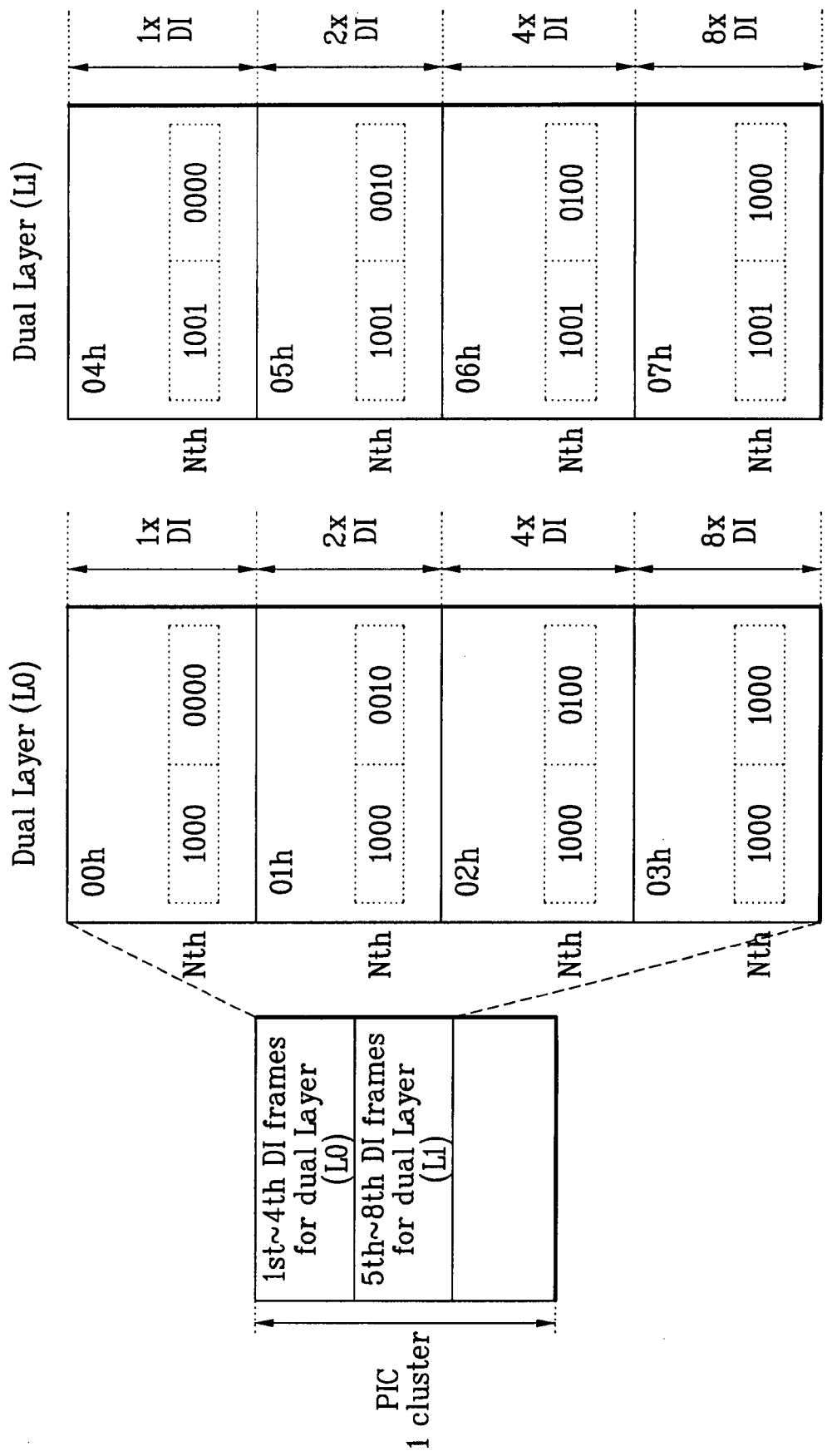

FIGS. 4A-4C illustrate the recording of disc information according to a first of four embodiments of the present invention, in which disc information is configured in a specific sequence per recording layer and recording velocity.

Referring to FIG. 4A, each disc information sequence is determined by a sequence number and is recorded using one byte. For instance, the information is recorded in a fifth byte (i.e., the "DI frame sequence number in DI block," which can be represented as 00h, 01h, 02h, 03h, 04h, 05h, 06h, or 07h) of the disc information, where a fifth byte of 00h or 07h indicates a first or eighth disc information, respectively.

Moreover, recording layer information and recording velocity information, which will be used by the corresponding disc information, are represented by specific bits and recorded in a specific area (Nth byte) within the disc information. For instance, the recording layer information and the recording velocity information are respectively recorded in the upper and lower four bits of the $N^{th}$ byte, where a recording layer information of 0000b, 1000b, or 1001b as the upper four bits indicates a single layer, a dual layer L0 (first layer), or a dual layer L1 (second layer), respectively, and a recording velocity information of 0000b, 0010b, 001b, 1000b, or 1111b as the lower four bits indicates a 1×-speed, 2×-speed, 4×-speed, 8×-speed, or 16×-speed recording velocity, respectively. By allocating one byte thusly, the recording layer information and the recording velocity information can be defined according to a system or specification enactment.

The recording layer information and the recording velocity information are recorded in a reserved specific location corresponding to their sequence number, as shown in FIG. 4A, thereby facilitating to confirm the recording layer information and the recording velocity information included in the corresponding disc information. By recording write power or write parameters as write strategy information fitting the corresponding recording layer and recording velocity in detail using the remainder of the bytes within the disc information, namely, the $44^{th}$~$111^{th}$ bytes, the recorded information enables efficient recording and reproducing of an optical disc. The information recorded in the $44^{th}$~$111^{th}$ bytes is referred to as the write strategy parameters.

FIG. 4B exemplarily shows disc information recorded in a single layer when representing the disc information shown in FIG. 4A. When an optical disc requires four different recording velocity information, four disc information corresponding to the four recording velocities are needed within a PIC area. In each disc information, its sequence number is recorded in a fifth byte and corresponding recording layer information and recording velocity information are recorded in an $N^{th}$ byte by allocating four bits to each of the corresponding recording layer information and the corresponding recording velocity information. For instance, a representation of recording velocities as 1×-speed, 2×-speed, 4×-speed, and 8×-speed corresponds to the case of the single layer in FIG. 4B. Hence, the upper four bits of the $N^{th}$ byte is 0000b to designate the single layer and the lower four bits indicate each recording velocity information. Specifically, 0000b indicating 1×-speed is written in the first disc information, 0010b indicating 2×-speed is written in the second disc information, 0100b indicating 4×-speed is written in the third disc information, and 1000b indicating 8×-speed is written in the fourth disc information.

FIG. 4C exemplarily shows disc information recorded in a dual layer when representing the disc information shown in FIG. 4A, in which each disc information corresponding to recording velocity information per recording layer is configured in configuring disc information in case that at least two recording layers exist. Namely, disc information is mainly configured per recording layer and another disc information according to recording velocity of a corresponding recording layer is then configured. In the aspect of a sequence of configuring disc information, disc information is preferentially configured on a recording layer; another disc information, according to a corresponding recording velocity in the corresponding recording layer, is then configured.

Hence, if an optical disc includes two recording layers and each recording layer requires four different recording velocity information, eight disc information are needed to cope with each recording velocity per recording layer within a PIC area. In each of the disc information, a sequence number is written in a fifth byte and recording layer information and recording velocity information are respectively written in four allocated bits of an $N^{th}$ byte.

For instance, if the recording velocities to be represented per recording layer are 1×-speed, 2×-speed, 4×-speed, and 8×-speed, first through fourth disc information are configured with disc information of a first recording layer (layer 0), the upper four bits of the $N^{th}$ byte are 1000b to designate the first recording layer, and the lower four bits of the $N^{th}$ byte indicate the respective recording velocity information. Specifically, 0000b indicating 1×-speed is written in the first disc information, 0010b indicating 2×-speed is written in the second disc information, 0100b indicating 4×-speed is written in third disc information, and 1000b indicating 8×-speed is written in the fourth disc information.

Moreover, fifth through eighth disc information are configured with disc information of a second recording layer (layer 1) of the dual layer. The upper four bits of the $N^{th}$ byte are 1001b to designate the second recording layer, and the lower four bits of the $N^{th}$ byte indicate the respective recording velocity information. Specifically, 0000b indicating 1×-speed is written in the fifth disc information, 0010b indicating 2×-speed is written in the sixth disc information, 0100b indicating 4×-speed is written in the seventh disc information, and 1000b indicating 8×-speed is written in the eighth disc information.

In the first embodiment, disc information is separated for each recording velocity in each layer. In accordance with another embodiment, disc information is separated for each recording layer, and each recording velocity per recording layer can be included in one DI. In this case, there is one DI per recording layer and the recorded DI volume varies according to the number of supported recording velocities.

Figure 5A:
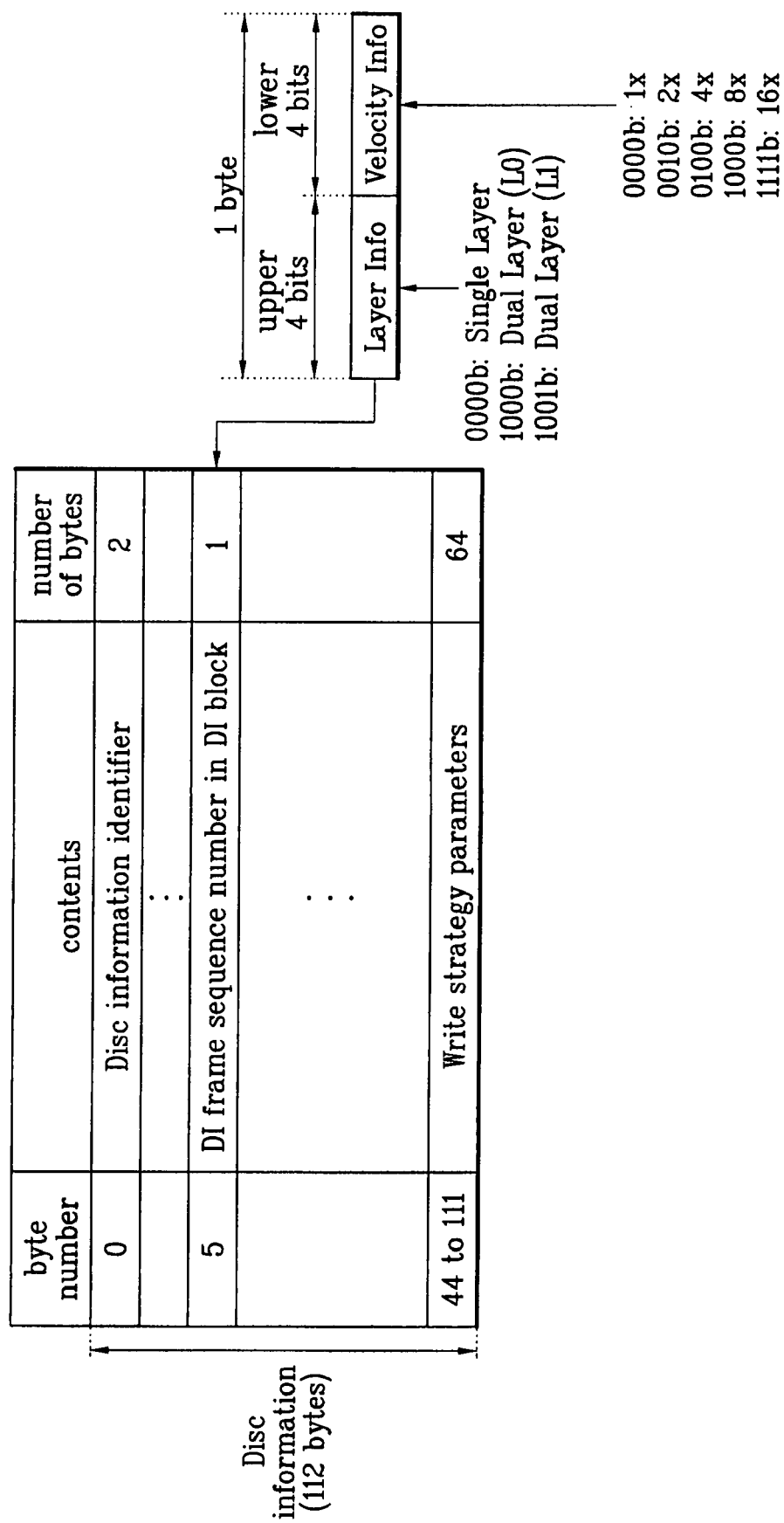
FIGS. 5A to 5C are diagrams of disc information recorded according to a second embodiment of the present invention.
Figure 5B:
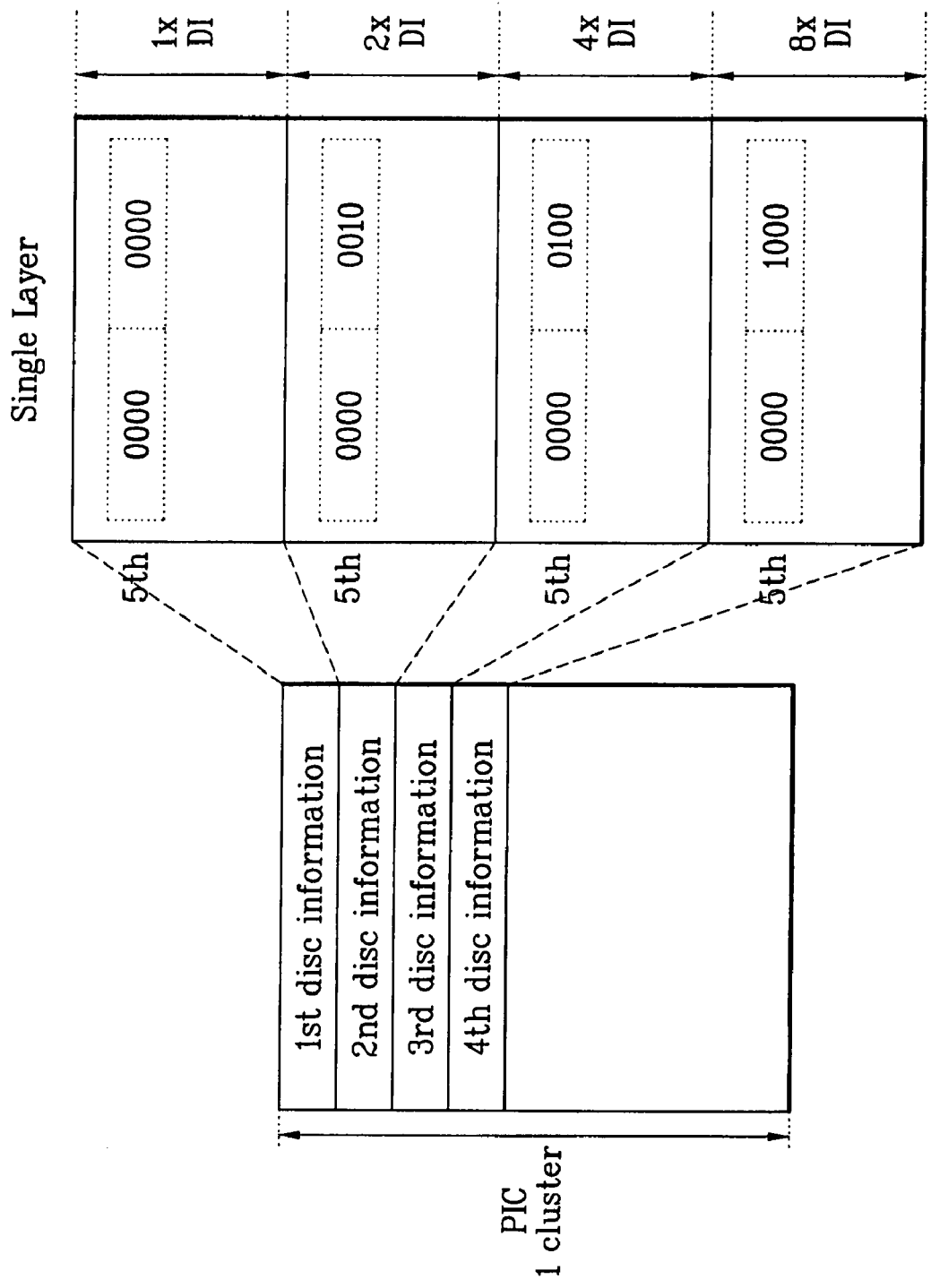
Figure 5C:
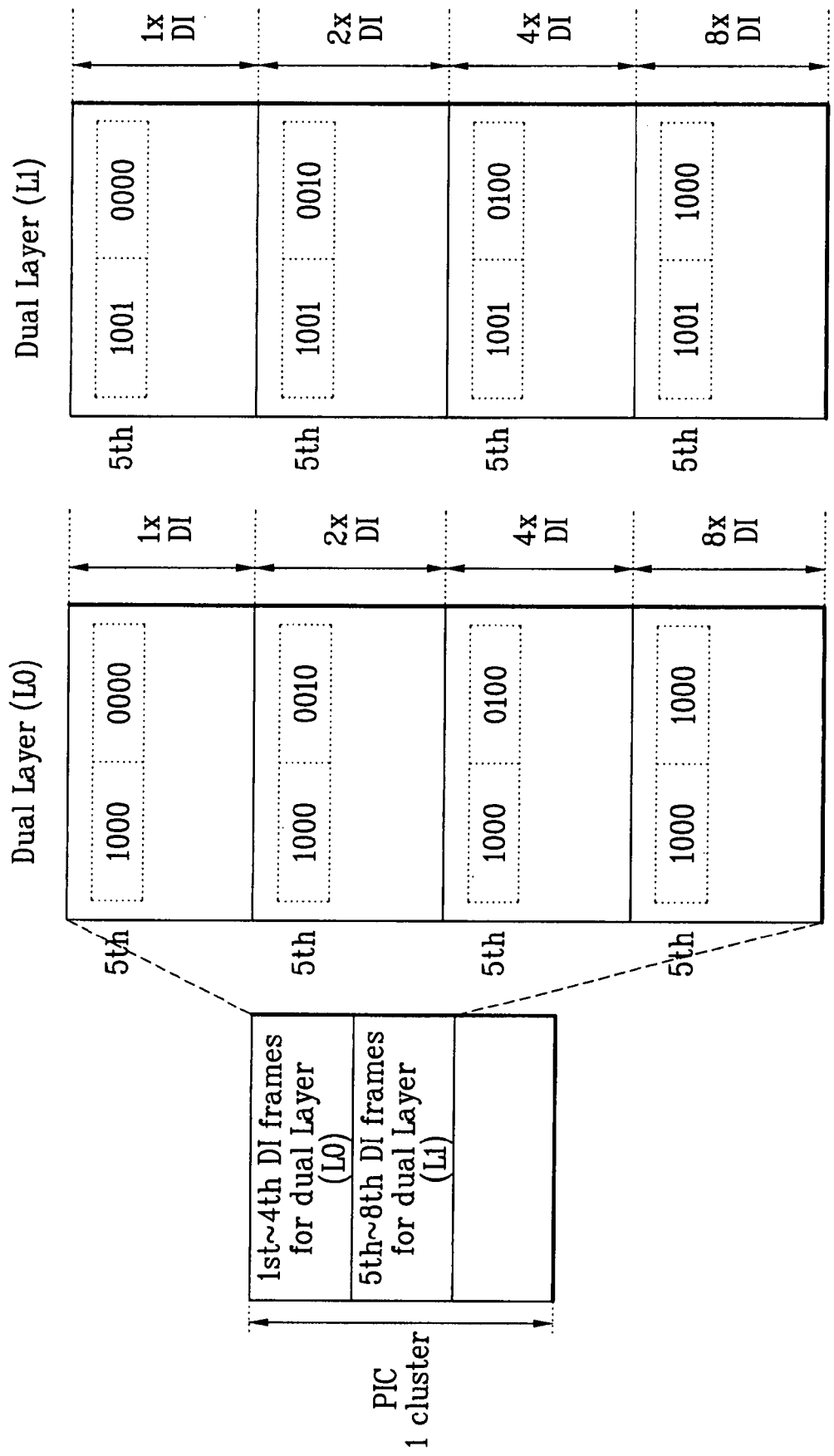

FIGS. 5A to 5C illustrate the recording of disc information according to a second of four embodiments of the present invention. In contrast to the first embodiment, the recording layer information and recording velocity information of the second embodiment are recorded in a fifth byte representing a sequence number of disc information.

Instead of simply indicating a sequence of continuous disc information, a sequence number within disc information indicates that the disc information is recorded in a specific sequence by writing recording layer information and recording velocity information of the present invention in the above area.

FIG. 5B illustrates the second embodiment applied to a single layer, in which recording layer information and recording velocity information are recorded in the same manner as the first embodiment (FIG. 4B) but are written in the fifth byte instead of $N^{th}$.

For instance, a representation of recording velocities as 1×-speed, 2×-speed, 4×-speed, and 8×-speed corresponds to the case of the single layer in FIG. 5B. Hence, the upper four bits of the fifth byte are 0000b designating the single layer, and the lower four bits of the fifth byte indicate each recording velocity information. Specifically, 0000b indicating 1×-speed is written in the first disc information, 0010b indicating 2×-speed is written in the second disc information, 0100b indicating 4×-speed is written in the third disc information, and 1000b indicating 8×-speed is written in the fourth disc information.

FIG. 5C illustrates the second embodiment applied to a dual layer, in which recording layer information and recording velocity information are recorded in the same manner as the first embodiment (FIG. 4B) but are written in a fifth byte instead of the $N^{th}$. For instance, if the recording velocities to be represented per recording layer are 1×-speed, 2×-speed, 4×-speed, and 8×-speed, the first through fourth disc information are configured with disc information of a first recording layer (layer 0) of the dual layer. Hence, the upper four bits of the fifth byte are 1000b to designate the first recording layer, and the lower four bits of the fifth byte means indicate each recording velocity information. Specifically, 0000b indicating 1×-speed is written in the first disc information, 0010b indicating 2×-speed is written in the second disc information, 0100b indicating 4×-speed is written in the third disc information, and 1000b indicating 8×-speed is written in the fourth disc information. Meanwhile, the fifth through eighth disc information are configured with disc information of a second recording layer (layer 1) of the dual layer. The upper four bits of the fifth byte are 1001b to designate the second recording layer, and the lower four bits of the fifth byte indicate each recording velocity information. Specifically, 0000b indicating 1×-speed is written in the fifth disc information, 0010b indicating 2×-speed is written in the sixth disc information, 0100b indicating 4×-speed is written in the seventh disc information, and 1000b indicating 8×-speed is written in the eighth disc information.

FIGS. 6A to 6E illustrate the recording of disc information according to a third of four embodiments of the present invention.

In the third embodiment, a plurality of disc information are recorded in a disc, a record sequence of each disc information is determined by a sequence number, and the record sequence is recorded in one byte. For instance, the corresponding information is recorded in a fifth byte (i.e., the "DI frame sequence number in DI block," which can be represented as 00h, 01h, 02h, 03h, 04h, 05h, 06h, or 07h) of the disc information. Here, for example, a fifth byte of 00h indicates the first disc information as well as disc information of 1×-speed of a first recording layer (Layer 0), a fifth byte of 01h indicates the second disc information as well as disc information of 2×-speed of the first recording layer, and a fifth byte of 07h indicates the eighth disc information as well as disc information of 8×-speed of a second recording layer (Layer 1). Hence, the disc information is preferentially arranged in a recording layer sequence and is configured to follow a per recording velocity information sequence.

Write strategy, interoperating with recording velocity meant by the corresponding disc information, is recorded in a specific area, e.g., a write strategy parameters field (the $L^{th} \sim 111^{th}$ bytes), within the disc information. Identification information for identifying the recorded write strategy type is recorded in another specific area, e.g., a write strategy code field (the $N^{th}$ byte), within the disc information. If there are N kinds of write strategy (WS), the identification information allocates a specific recognition value to each write strategy, setting, for instance, 0000 0001b to indicate a first write strategy (WS-1), 0000 0010b to indicate a second write strategy (WS-2), and XXXX XXXXb to indicate an $N^{th}$ write strategy (WS-N). A WS type of 0000 0000b can be set to indicate that no specific WS type exists as well as WS parameters. Namely, the WS code, information of the N byte can be utilized to indicate that there is no WS as well as information designating the WS type.

FIG. 6B shows an example of recording disc information for a specific write strategy, in which a disc manufacturer selects to record WS-1 from various specifications in recording a write strategy for 1×-speed within 1×-speed disc information of a first recording layer. Namely, a write strategy code field ($N^{th}$ byte) of 0000 0001b indicates a first write strategy, and parameter values corresponding to WS-1 are written in the write strategy parameters field (the $L^{th} \sim 111^{th}$ bytes).

If a disc manufacturer selects to record in WS-2, 0000 0010b is written in the write strategy code field and WS-2 parameters will be written in the $L^{th} \sim 111^{th}$ bytes. These write strategy parameters have different values according to the kind of write strategy. The corresponding write strategy parameters are predetermined, as specified information fitting the characteristics of the disc, and made available to a disc manufacturer or a system designer. As such, the write strategy parameters have arbitrary values with no relevance to the present invention.

Figure 6A:
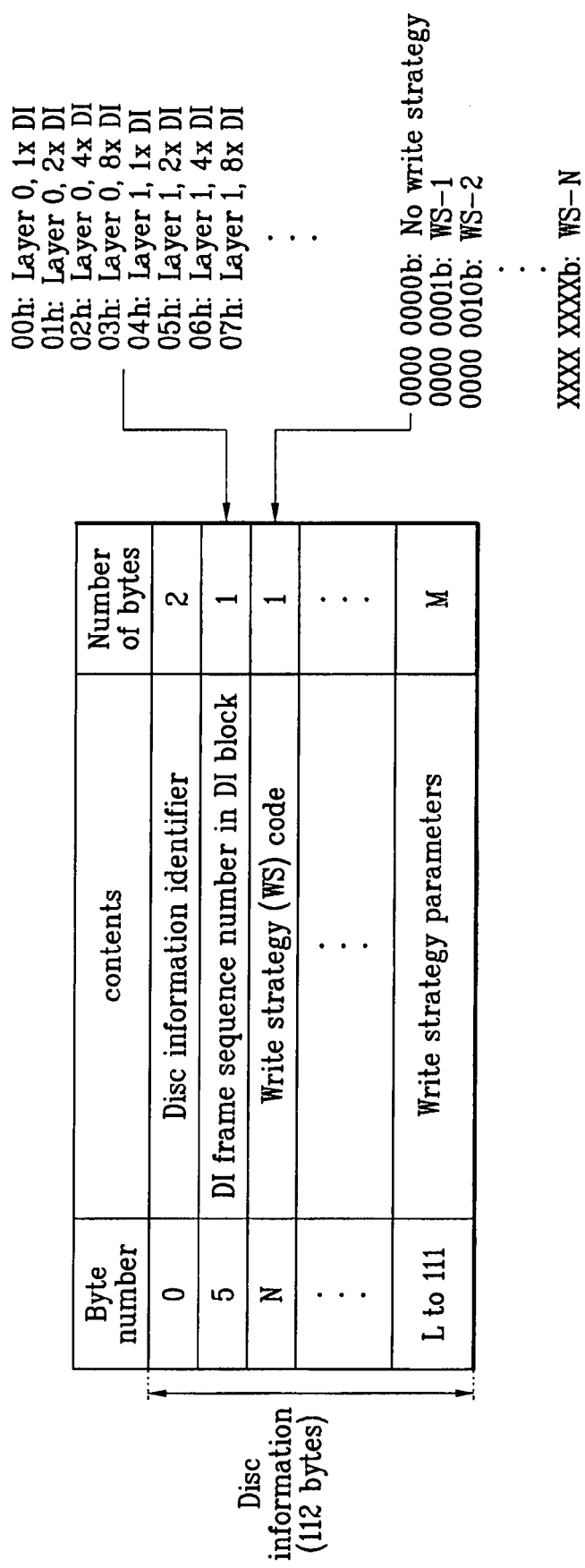
Figure 6C:
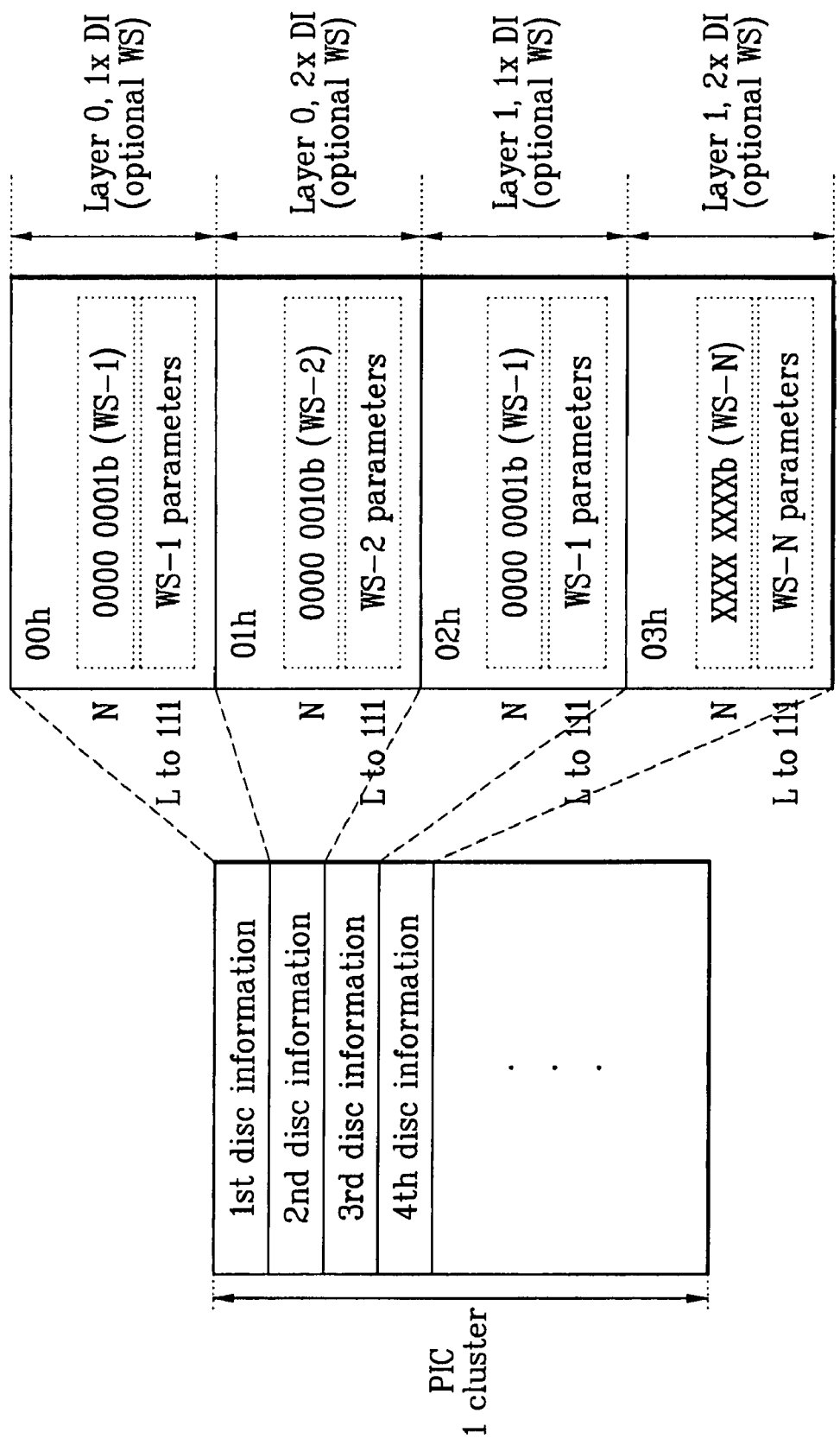
Figure 6D:
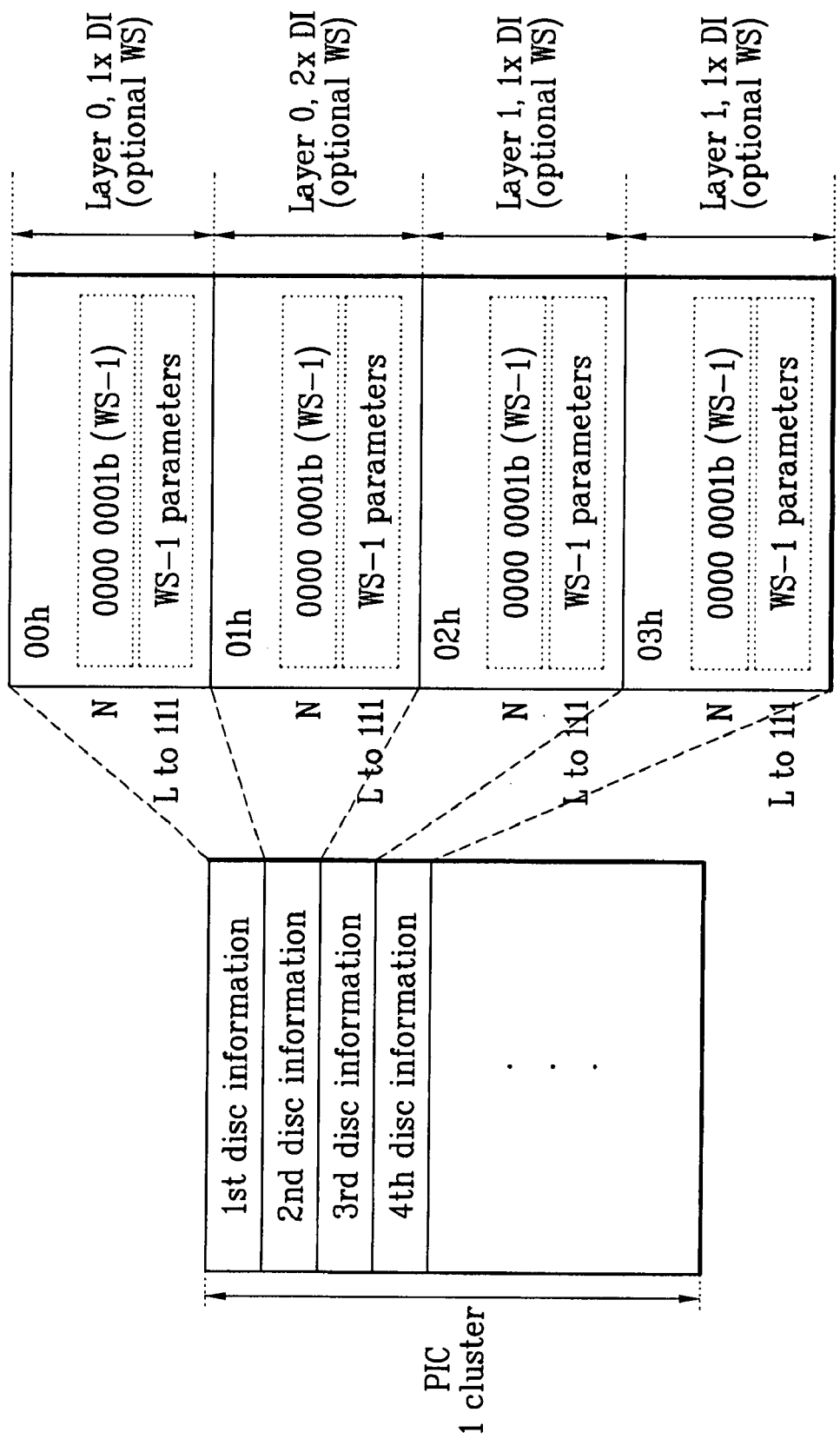
Figure 6E:
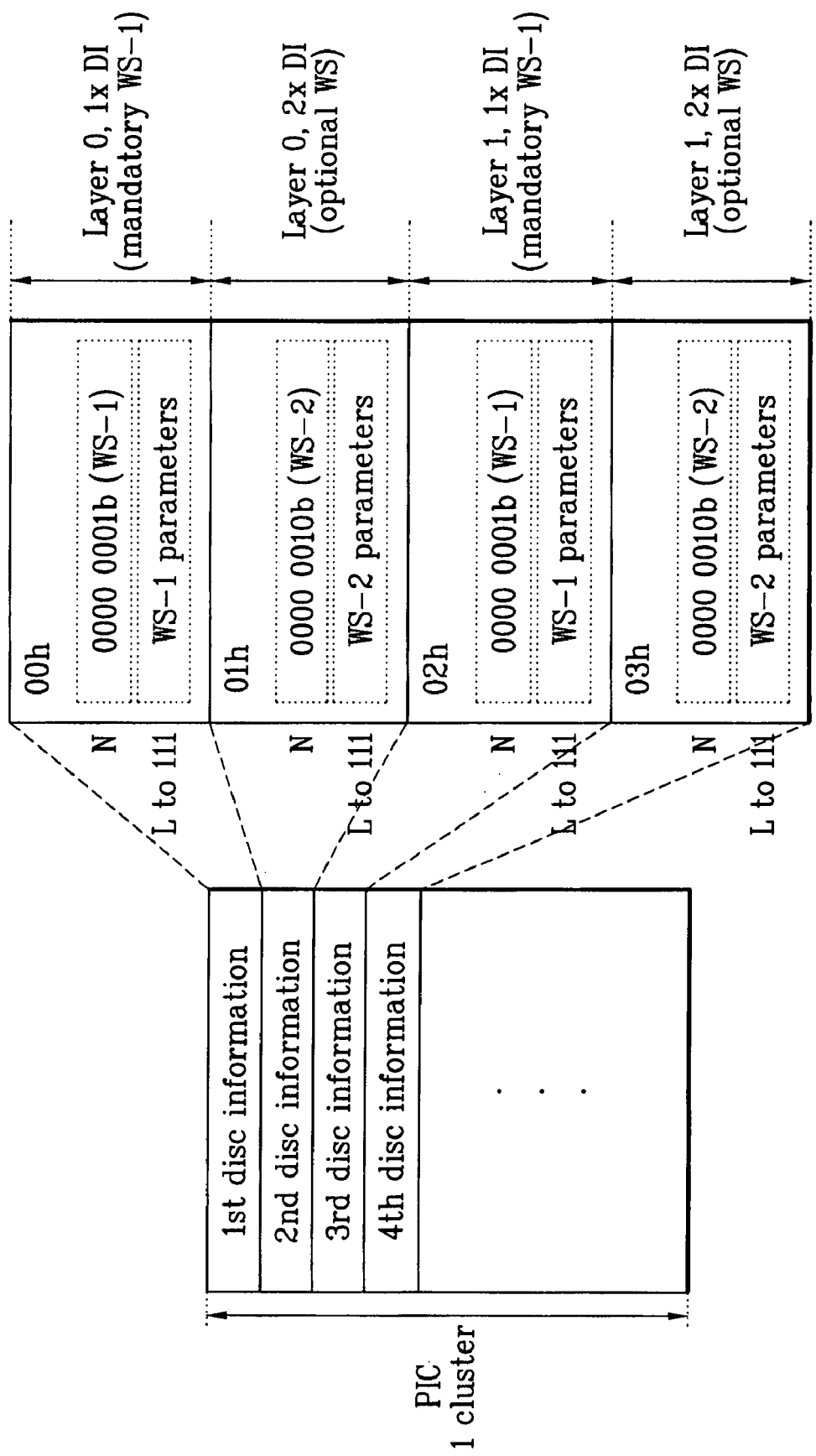

FIGS. 6C to 6E show specific embodiments for including the write strategy in the disc information of the present invention, assuming a dual-layer disc in which 1×-speed and 2×-speed are applied to the two recording layers, respectively. Here, FIGS. 6C and 6D show a write strategy optionally selected to be recorded for all recording layers and recording velocities on manufacturing a disc, and FIG. 6E shows a recorded write strategy predetermined based on a mandatory recording at a specific recording velocity.

FIG. 6C shows a case of optionally recording the write strategy for all recording layers and recording velocities. For instance, 00h is recorded to indicate disc information of 1×-speed for a first recording layer, and WS-1 is selected as the write strategy; 01h is recorded to indicate disc information of 2×-speed for the first recording layer, and WS-2 is selected as the write strategy; 02h is recorded to indicate disc information of 1×-speed for a second recording layer, and WS-1 is selected as the write strategy; and 03h is recorded to indicate disc information of 2×-speed for the second recording layer, and WS-N is selected as the write strategy.

FIG. 6D shows another example of optionally recording the write strategy, in which the same write strategy is applied to the disc information of every recording layer and recording velocity. Since write strategy can be optionally recorded, a disc manufacturer may apply the entire disc information identically for one most reliable write strategy. FIG. 6D illustrates a case that WS-1 is written for every disc information.

FIG. 6E shows a method of recording a write strategy previously determined in a mandatory manner in case of a specific recording velocity and write strategies optionally for all other recording velocities. The write strategy for 1×-speed is considered primary, where a specific method is predetermined, and a disc manufacturer can optionally record all other recording velocities. For instance, if the write strategy mandatory for the 1×-speed is WS-1, 00h is recorded to indicate disc information of 1×-speed for a first recording layer, and WS-1 is set as the mandatory write strategy. Then, 01h is recorded to indicate disc information of 2×-speed for the first recording layer, and WS-2 is selected as the write strategy that can be optionally recorded; 02h is recorded to indicate disc information of 1×-speed for a second recording layer, and WS-1 is selected as the mandatory write strategy; and 03h is recorded to indicate disc information of 2×-speed for the second recording layer, WS-2 is selected as the write strategy that can be optionally recorded.

In applying the case of FIG. 6E, one of a plurality of specified write strategies is uniformly written as the 1×-speed write strategy in a mandatory manner, thereby enabling to secure recording characteristics of the disc more. A disc manufacturer can optionally record one of a plurality of the specified write strategies uniformly for all recording velocities besides the 1×-speed, whereby a disc manufacturing process time can be shortened. Here, the mandatory write strategy for 1×-speed can be recorded and a disc manufacturer can optionally record another write strategy for 1×-speed separately, in which case the disc information for 1×-speed is made up of one disc information including the specified mandatory write strategy and another disc information including the optional write strategy.

Figure 7A:
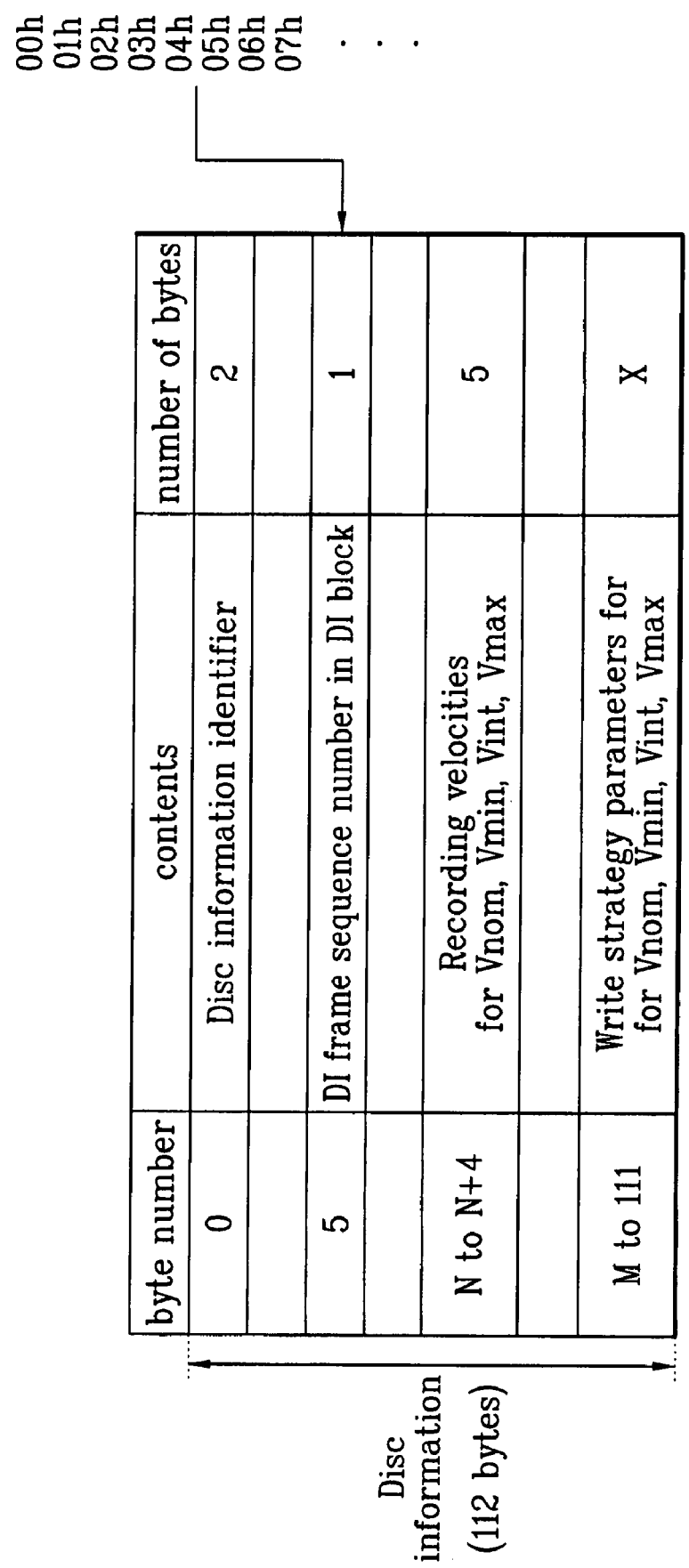
FIGS. 7A and 7B are diagrams of disc information recorded according to a fourth embodiment of the present invention.
Figure 7B:
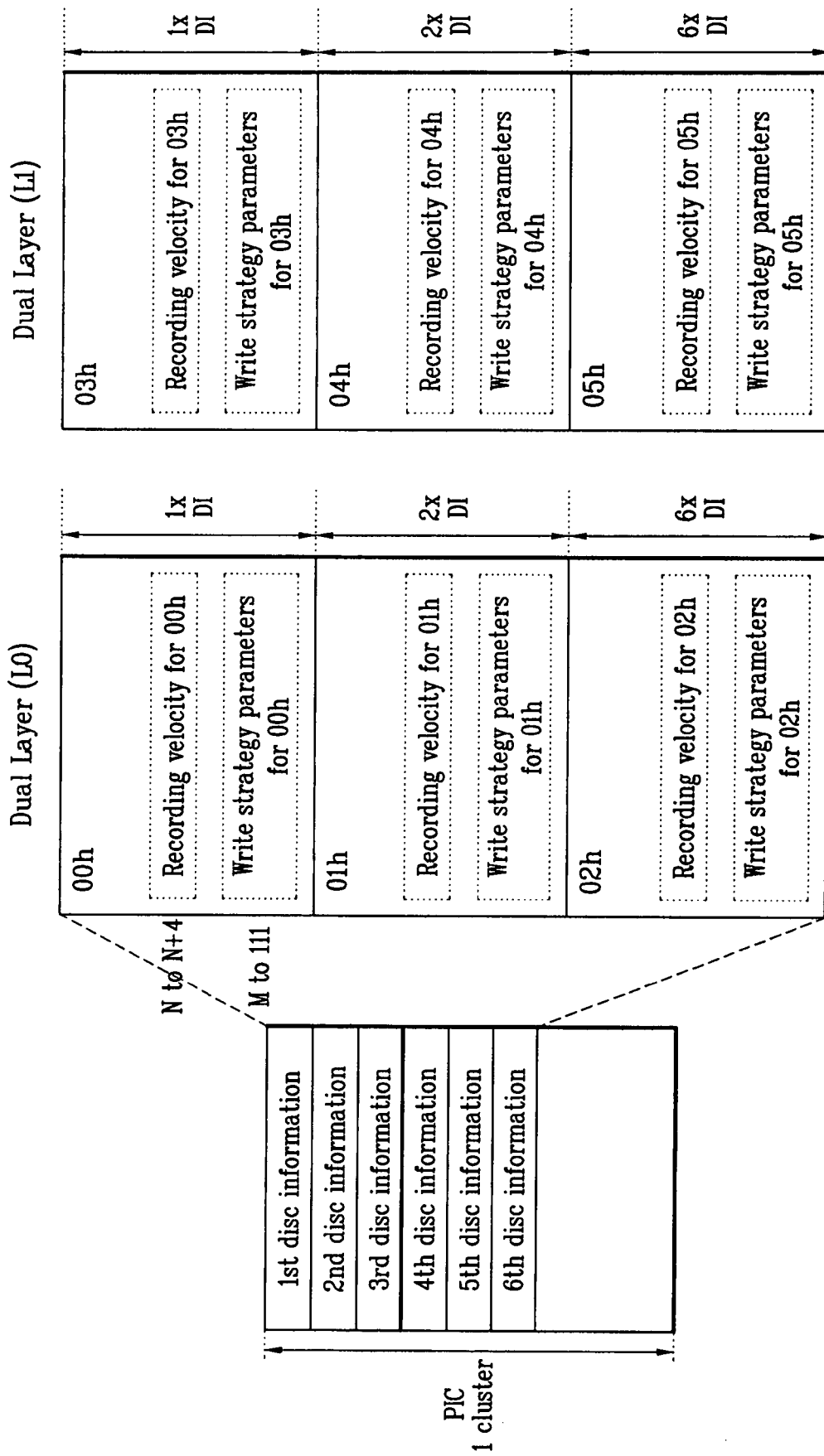

FIGS. 7A and 7B illustrate the recording of disc information according to a fourth of four embodiments of the present invention. First of all, a plurality of disc information are recorded in a disc, a record sequence of each disc information is determined by a sequence number, and the record sequence is written in one byte. For instance, the corresponding information is recorded in a fifth byte (i.e., the "DI frame sequence number in DI block," which can be represented as 00h, 01h, 02h, 03h, 04h, 05h, 06h, or 07h) of the disc information, where a fifth byte of 00h, 01h, or 07h indicates a first disc information of 2×-speed for a first recording layer, a second disc information of 2×-speed for the first recording layer, or an eighth disc information of 8×-speed for a second recording layer, respectively. Hence, the disc information is preferentially arranged in a recording layer sequence and is configured to follow a per recording velocity information sequence.

In a specific area within the disc information, recording velocity information designated by the corresponding disc information and write strategy coping with the corresponding recording velocity are written in a reserved specific location. For instance, the recording velocity information of the corresponding disc information is written in the $N^{th} \sim (N+4)^{th}$ bytes, and the write strategy coping with the corresponding recording velocity is written in the $M^{th} \sim 111^{th}$ bytes.

For the fourth embodiment of the present invention to provide disc information coping with high recording velocity, the recording velocity information and write strategy are written for each of a plurality of recording velocity information, i.e., a nominal recording velocity (Vnom), a maximum recording velocity (Vmax), a minimum recording velocity (Vmin), and an intermediate recording velocity (Vint). Here, the nominal recording velocity is a basic recording velocity of a corresponding disc and is generally written as information associated with 1×-speed; the maximum recording velocity is an applicable maximum recording velocity (e.g., 3×-speed)

associated with the optimal recording velocity; the minimum recording velocity ins an applicable minimum recording velocity (e.g., Vmax/2.4) associated with the optimal recording velocity; and the intermediate recording velocity is an applicable intermediate recording velocity (e.g., 1.7×Vmin) associated with the optimal recording velocity. The above relation of recording velocity values has been determined by considering a radius ratio between inner and outer circumferences of a Blu-ray disc applicable to the present invention. It is apparent that such a relation can be variably applied to other kinds of discs and that the recording velocity values can be set to different values according to disc characteristics.

Relating to the optimal recording velocity (1×-speed), the same information is preferably recorded in each disc information. Preferably, the maximum, minimum, and intermediate recording velocities are differently determined according to the maximum recording velocity value as far as the corresponding information is applicable.

Though any number of intermediate recording velocities can be established, the present invention is characterized in having at least one intermediate recording velocity. At least four recording velocity information are included in one disc information, with system operation benefiting from larger numbers of recording velocity information. By utilizing a recordable area within disc information to the maximum, many intermediate recording velocity information can be provided.

FIG. 7B schematically shows disc information recorded in the case of FIG. 7A, and more particularly, in the case of a dual layer. For instance, when an optical disc requires three different recording velocity information per recording layer, six disc information corresponding to the respective recording velocities are needed within a PIC area. Each disc information is allocated to write a sequence number, corresponding recording velocity information, and corresponding write strategy to a predetermined area.

For instance, if the recording velocities to be represented are 1×-speed, 2×-speed, and 6×-speed, the disc information for a first recording layer includes first, second, and third disc information. Here, the first disc information is 1×-speed disc information of the first recording layer, its sequence number corresponding to 00h, and the corresponding recording velocity and write strategy are written in a reserved location, i.e., the $N^{th} \sim (N+4)^{th}$ bytes and the $M^{th} \sim 111^{th}$ bytes, respectively; the second disc information is 2×-speed disc information of the first recording layer, its sequence number corresponding to 01h, and the corresponding recording velocity and write strategy are written in similarly reserved locations; and the third disc information is 6×-speed disc information of the first recording layer, its sequence number corresponding to 02h, and the corresponding recording velocity and write strategy are written in similarly reserved locations.

Likewise, fourth, fifth, and sixth disc information are for a second recording layer, where the fourth disc information is 1×-speed disc information of the second recording layer and its sequence number corresponds to 03h, where the fifth disc information is 2×-speed disc information of the second recording layer and its sequence number corresponds to 04h, and where the sixth disc information is 6×-speed disc information of the second recording layer and its sequence number corresponds to 05h. In this case, corresponding recording velocity and write strategy are written in the same location as in the case of the first recording layer.

In the fourth embodiment of the present invention, a plurality of recording velocity information are all included in one disc information, but one write strategy associated with specific recording velocity information can be written in one disc information with the remainder written in another disc information. For instance, regarding four kinds of recording velocity information, the number of required disc information will be four times more than that of the above-explained embodiment. Yet, the PIC area, in which the disc information of 112 bytes is written, is an area providing for a sufficiently large number of disc information to be written information.

Figure 8:
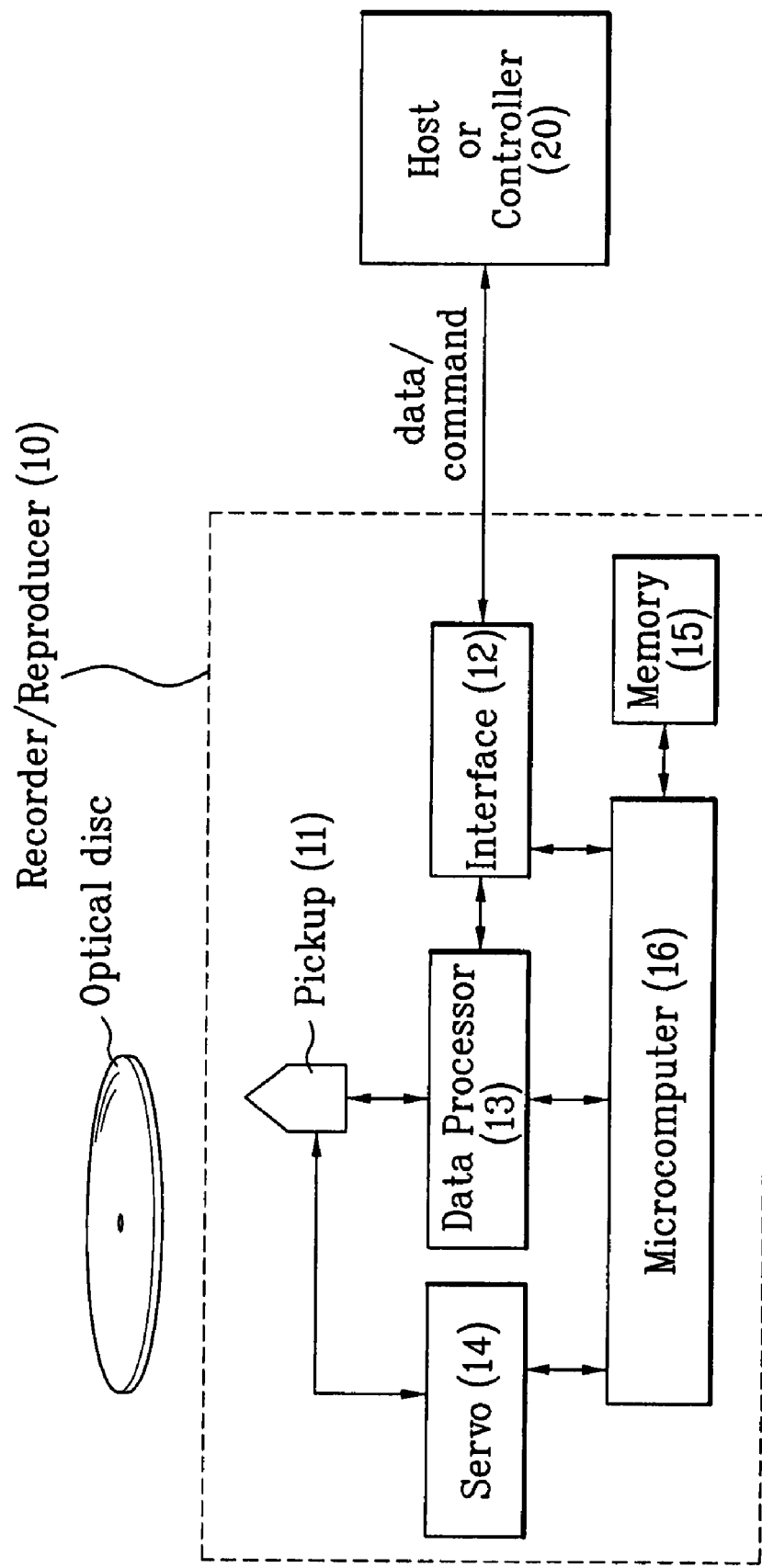
FIG. 8 is a block diagram of an optical disc recording and reproducing apparatus using disc control information according to the present invention.

FIG. 8 illustrates an optical disc recording and reproducing apparatus using disc control information according to the present invention. The recording and reproducing apparatus comprises a recorder/reproducer 10 for recording data on and reproducing data from an optical disc and a controller 20 for controlling the recorder/reproducer 10. The controller 20 generates a record or playback command for a specific area, and the recorder/reproducer 10 caries out the record/playback function for the specific area accordingly. The recorder/reproducer 10 includes an interface 12 for communicating with an external device, i.e., the controller (or host); a pickup 11 for performing read and write operations with respect to the optical disc; a data processor 13 for modulating the pickup's input signal for performing a reproduction operation and for demodulating the pickup's output signal for performing a record operation; a servo 14 for controlling the read and write operations of the pickup; a memory 15 for temporarily storing disc control information; and a microcomputer 16 for respectively controlling each element of the recorder/reproducer.

In a recording data on an optical disc according to the present invention, the optical disc recording and reproducing apparatus first reads the entire disc management area of an inserted optical disc, the read information being disc information of the present invention, which is temporarily stored in the memory 15. Thus, the recording layer information, recording velocity information, and write strategy fitting the corresponding recording velocity are read out and temporarily stored.

If intending to perform a writing on a specific area within the optical disc, the controller 20 renders such an intent into a writing command and then delivers it to the recorder/reproducer 10 together with data for writing location information to be recorded. After receiving the writing command, the microcomputer 16 decides the corresponding recording velocity applied to an intended recording layer within the optical disc from the management information stored in the memory 15 and then performs the writing command using the most optimal write strategy by referring to the decided recording velocity.

Accordingly, the present invention provides methods of formatting disc control information for coping with higher recording velocities in a high-density optical disc, enabling standardized disc control information to be used when recording and reproducing.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of recording control information on a recording medium having at least two recording layers, the method comprising:

providing control information for the recording layers, the control information including information units usable for reproducing or recording data from or on the recording medium, each information unit for a specific recording layer and a specific recording velocity, at least one information unit being arranged among the information units first according to ascending recording layer, and for a same recording layer the at least one information unit being arranged among the information units according to write strategies applicable to the recording layer, wherein the control information further includes at least one information unit for alternative write strategies and, for a same recording velocity, the at least one information unit for the alternative write strategies follows the at least one information unit being arranged among the information units according to write strategies; and recording the control information within a specific area of the recording medium.

2. The method of claim 1, wherein the specific area is an area of the specific recording layer among the recording layers.

3. The method of claim 2, wherein the specific area is a lead-in area of the specific recording layer.

4. The method of claim 3, wherein, for each recording layer, the control information includes at least one information unit for write strategy information usable for recording the data on the recording medium.

5. The method of claim 4, wherein the write strategy information includes write strategy parameters, and the write strategy parameters include a recording speed, a maximum read power, an indicative write power, a write pulse duration and a write pulse start time.

6. The method of claim 5, wherein the write strategy information includes basic write strategy information and alternative write strategy information.

7. A method of recording data on a multi-layer recording medium, the method comprising:

accessing more than one control information, the control information including information usable for reproducing or recording data from or on the multi-layer recording medium, each control information for a specific recording layer and a specific recording velocity, at least one control information being arranged among the control information first according to ascending recording layer and for a same recording layer the at least one control information being arranged among the control information according to write strategies applicable to each recording layer, wherein the control information further includes at least one control information for alternative write strategies and, for a same recording velocity, the at least one control information for the alternative write strategies follows the at least one control information being arranged among the control information according to write strategies; and recording data on the recording medium based on at least one of the control information.

8. The method of claim 7, wherein the specific area is an area of the specific recording layer among the recording layers.

9. The method of claim 8, wherein the specific area is a lead-in area of the specific recording layer.

10. The method of claim 9, wherein at least one of the control information includes write strategy information usable for recording the data on the recording medium.

11. The method of claim 8, wherein the write strategy information includes write strategy parameters, the write strategy parameters including a recording speed, a maximum read power, an indicative write power, a write pulse duration and a write pulse start time.

12. The method of claim 11, wherein the write strategy information includes basic write strategy information and alternative write strategy information.

13. An apparatus for recording control information on a recording medium having at least two recording layers, the apparatus comprising:

an optical pickup configured to record data on the recording medium;

a controller, operatively coupled to the optical pickup, configured to control the optical pickup to record control information for the recording layers on a specific area of the recording medium, the control information including information units usable for reproducing or recording data from or on the recording medium, each information unit for a specific recording layer and a specific recording velocity, at least one information unit being arranged among the information units first according to ascending recording layer, and for a same recording layer the at least one information unit being arranged among the information units according to write strategies applicable to the recording layer, wherein the control information further includes at least one information unit for alternative write strategies and, for a same recording velocity, the at least one information unit for the alternative write strategies follows the at least one information unit being arranged among the information units according to write strategies.

14. The apparatus of claim 13, further comprising:

a servo, operatively coupled to the optical pickup, configured to control a servo operation of the optical pickup according to a recording speed.

15. The apparatus of claim 14, wherein the controller is configured to control the optical pickup to record the control information on the lead-in area of the specific recording layer.

16. The apparatus of claim 15, wherein at least one information unit includes write strategy information usable for recording data on the recording medium.

17. The apparatus of claim 16, wherein the write strategy information includes write strategy parameters, the write strategy parameters including a recording speed, a maximum read power, an indicative write power, a write pulse duration and a write pulse start time.

18. The apparatus of claim 17, wherein the write strategy information includes basic write strategy information and alternative write strategy information.

19. An apparatus for recording data on a multi-layer recording medium, the apparatus comprising:

an optical pickup configured to record data on the recording medium;

a memory configured to store more than one control information on a specific area of the multi-layer recording medium, the control information including information usable for reproducing or recording data from or on the multi-layer recording medium, each control information for a specific recording layer and a specific recording velocity, at least one control information being arranged among the control information first according to ascending recording layer of the multi-layer recording medium, and for a same recording layer the at least one control information being arranged among the control information according to write strategies for each recording layer, wherein the control information further includes at least one control information for alternative write strategies and, for a same recording velocity, the at least one control information for the alternative write strategies follows the at least one control information being arranged among the control information according to write strategies; and a controller, operatively coupled to the optical pickup and the memory, configured to control the optical pickup to record data on the recording medium based on at least one of the control information.

20. The apparatus of claim 19, wherein the controller is configured to control the optical pickup to record the control information on the lead-in area of the specific recording layer.

21. The apparatus of claim 20, wherein
at least one of the control information includes write strategy information usable for recording the data on the recording medium; and
the controller is configured to control the optical pickup to record data based on the write strategy information.

22. The apparatus of claim 21, wherein the write strategy information includes write strategy parameters, the write strategy parameters including a recording speed, a maximum read power, an indicative write power, a write pulse duration and a write pulse start time.

23. The apparatus of claim 22, wherein the write strategy information includes basic write strategy information and alternative write strategy information.

24. The apparatus of claim 23, further comprising:
a servo, operatively coupled to the optical pickup, configured to control a servo operation of the optical pickup according to a recording speed.

25. The apparatus of claim 24, wherein the multi-layer recording medium is a recordable DVD and the apparatus is a DVD recorder configured to record on the recordable DVD.

26. The apparatus of claim 24, further comprising:
a host device operatively coupled to the controller via an interface, the host device configured to transmit a command via the interface.

27. A computer-readable medium storing a data structure for managing reproduction from or writing to the computer-readable medium, comprising:
a specific area of the computer readable medium storing control information for at least two recording layers of the computer-readable medium, the control information including information units usable for reproducing or recording data from or on the computer-readable medium, each information unit for a specific recording layer and a specific recording velocity, at least one information unit being arranged among the information units first according to ascending recording layer, and for a same recording layer the at least one information unit being arranged among the information units according to write strategies applicable to the recording layer,
wherein the control information further includes at least one information unit for alternative write strategies and, for a same recording velocity, the at least one information unit for the alternative write strategies follows the at least one information unit being arranged among the information units according to write strategies.

28. The computer-readable medium of claim 27, wherein the specific area is an area of the specific recording layer among the recording layers.

29. The computer-readable medium of claim 28, wherein the specific area is a lead-in area of the specific recording layer.

30. The computer-readable medium of claim 29, wherein the control information is physical format information related to the recording medium.

31. The computer-readable medium of claim 30, wherein at least one information unit includes write strategy information usable for recording data on the recording medium.

32. The computer-readable medium of claim 31, wherein the write strategy information includes write strategy parameters, the write strategy parameters including a recording speed, a maximum read power, an indicative write power, a write pulse duration and a write pulse start time.

33. The computer-readable medium of claim 32, wherein the write strategy information includes basic write strategy information and alternative write strategy information.

34. The computer-readable medium of claim 33, wherein the computer-readable medium is a recordable DVD.

35. A computer-readable multi-layer optical disc, comprising:
at least a first layer and a second layer;
a first area included in the first layer and a second area included in the second layer,
wherein the first and second areas are for control information, the control information usable for recording data on the computer-readable multi-layer optical disc, each control information for a specific recording layer and a specific recording velocity, and at least one control information being arranged among the control information first according to ascending recording layer and for a same recording layer the at least one control information being arranged among the control information according to write strategies applicable to the recording layer,
wherein the control information further includes at least one control information for alternative write strategies and, for a same recording velocity, the at least one control information for the alternative write strategies follows the at least one control information being arranged among the control information according to write strategies.

36. The computer-readable multi-layer optical disc of claim 35, wherein the first and second areas are located more radially inward on the computer-readable multi-layer optical disc than a data area included in each layer.

37. The computer-readable multi-layer optical disc of claim 36, wherein the first area is a lead-in area and the second area is a lead-out area.

38. The computer-readable multi-layer optical disc of claim 37, wherein the control information includes write strategy information usable for recording the data on the computer-readable multi-layer optical disc.

39. The computer-readable multi-layer optical disc of claim 38, wherein the write strategy information includes write strategy parameters, the write strategy parameters including a recording speed, a maximum read power, an indicative write power, a write pulse duration and a write pulse start time.

40. The computer-readable multi-layer optical disc of claim 39, wherein the write strategy information includes basic write strategy information and alternative write strategy information.

41. The computer-readable multi-layer optical disc of claim 40, wherein the computer-readable multi-layer optical disc is a recordable DVD.

42. The method of claim 1, wherein the control information further includes at least one information unit for second alternative write strategies, the information unit for the second alternative write strategies is usable for a specific recording velocity different from the recording velocity for the at least one information unit being arranged among the information units according to write strategies.

43. The method of claim 7, wherein the control information further includes at least one control information for second alternative write strategies, the control information for the second alternative write strategies is usable for a specific recording velocity different from the recording velocity for the at least one control information being arranged among the control information according to write strategies.

44. The apparatus of claim 13, wherein the control information further includes at least one information unit for second alternative write strategies, the information unit for the second alternative write strategies is usable for a specific recording velocity different from the recording velocity for the at least one information unit being arranged among the information units according to write strategies.

45. The apparatus of claim 19, wherein the control information further includes at least one control information for second alternative write strategies, the control information for the second alternative write strategies is usable for a specific recording velocity different from the recording velocity for the at least one control information being arranged among the control information according to write strategies.

46. The computer-readable medium of claim 27, wherein the control information further includes at least one information unit for second alternative write strategies, the information unit for the second alternative write strategies is usable for a specific recording velocity different from the recording velocity for the at least one information unit being arranged among the information units according to write strategies.

47. The computer-readable multi-layer optical disc of claim 35, wherein the control information further includes at least one control information for second alternative write strategies, the control information for the second alternative write strategies is usable for a specific recording velocity different from the recording velocity for the at least one control information being arranged among the control information according to write strategies.

* * * * *